(12) United States Patent
Ikeda

(10) Patent No.: US 9,049,635 B2
(45) Date of Patent: Jun. 2, 2015

(54) MOBILE COMMUNICATION SYSTEM, MOBILE STATION, BASE STATION, AND HANDOVER METHOD

(75) Inventor: Goro Ikeda, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 568 days.

(21) Appl. No.: 13/505,962

(22) PCT Filed: Nov. 2, 2010

(86) PCT No.: PCT/JP2010/069532
§ 371 (c)(1),
(2), (4) Date: Mar. 29, 2013

(87) PCT Pub. No.: WO2011/055729
PCT Pub. Date: May 12, 2011

(65) Prior Publication Data
US 2013/0188597 A1    Jul. 25, 2013

(30) Foreign Application Priority Data

Nov. 4, 2009    (JP) .................... 2009-253506

(51) Int. Cl.
*H04W 36/18*    (2009.01)
*H04L 5/00*    (2006.01)
*H04W 36/00*    (2009.01)

(52) U.S. Cl.
CPC ............. *H04W 36/18* (2013.01); *H04L 5/0007* (2013.01); *H04L 5/0053* (2013.01); *H04W 36/0072* (2013.01)

(58) Field of Classification Search
CPC .............. H04L 5/0007; H04L 5/0053; H04W 36/0072; H04W 36/18

USPC ......................................................... 370/331
See application file for complete search history.

(56) References Cited

U.S. PATENT DOCUMENTS

| 5,787,346 | A | 7/1998 | Iseyama |
| 2011/0038351 | A1 | 2/2011 | Sahara |
| 2013/0301616 | A1* | 11/2013 | Yano et al. ............ 370/331 |

FOREIGN PATENT DOCUMENTS

| JP | 09-163431 A | 6/1997 |
| JP | 2008-113090 A | 5/2008 |
| WO | 2008/123074 A1 | 10/2008 |
| WO | 2009/128456 A1 | 10/2009 |

OTHER PUBLICATIONS

International Preliminary Report on Patentability and the translation of the Written Opinion of the International Searching Authority dated Nov. 30, 2010; International Application No. PCT/JP2010/069532.

(Continued)

*Primary Examiner* — Jung Park
*Assistant Examiner* — Albert Shih
(74) *Attorney, Agent, or Firm* — Studebaker & Brackett PC

(57) ABSTRACT

In a handover of a mobile station (12) from a base station (14-1) to a base station (14-2), the base station (14-2) determines ANCH2 to be allocated to the mobile station of a operation frequency band of the base station (14-2), and notifies the mobile station of the determined ANCH2 via a CCH. The mobile station shifts, when a timeslot of ANCH2 is different from a timeslot of ANCH1, a operation frequency band of the mobile station in the timeslot of ANCH2 from a operation frequency band of the base station (14-1) to a frequency band which contains ANCH2. The mobile station then establishes a connection to the base station (14-2) via ANCH2, disconnects the connection to the base station (14-1), and completely shifts the operation frequency band to the frequency band of the base station (14-2).

8 Claims, 30 Drawing Sheets

(56) References Cited

OTHER PUBLICATIONS

Association of Radio Industries and Businesses; "ARIB STD-195 Version 1.2 OFDMA/TDMA TDD Broadband Wireless Access System (Next Generation PHS)"; Mar. 18, 2009.

Association of Radio Industries and Businesses. ARIB STD-195 Version 1.2. "OFDMA/TDMA TDD Broadband Wireless Access System (Next Generation PHS)." Mar. 18, 2009.

* cited by examiner

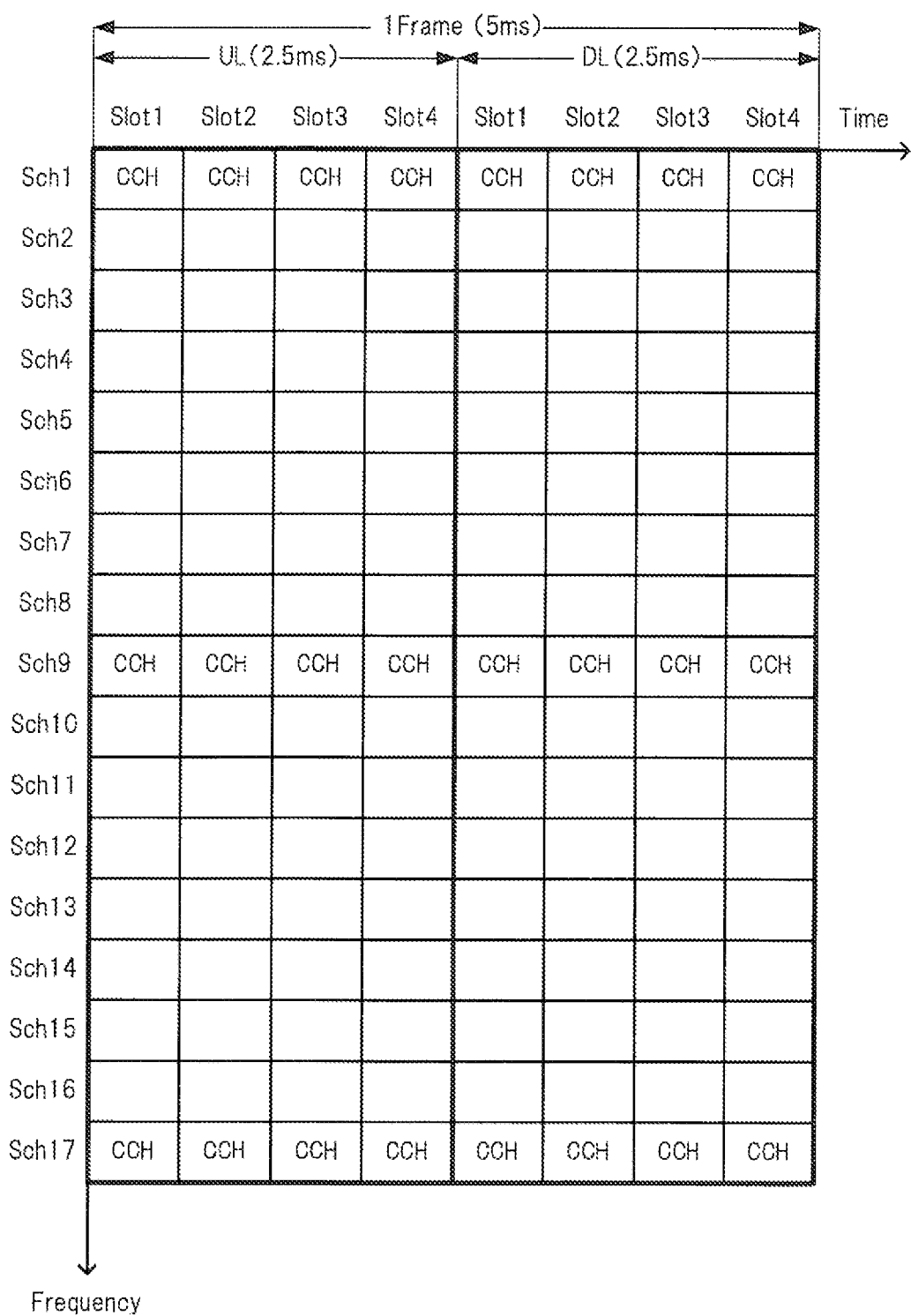

FIG.2B

| | Slot1 | Slot2 | Slot3 | Slot4 |
|---|---|---|---|---|
| Sch1 | CCH | CCH | CCH | CCH |
| Sch2 | | | | |
| Sch3 | | | | |
| Sch4 | | | | |
| Sch5 | | | | |
| Sch6 | | | | |
| Sch7 | | | | |
| Sch8 | | | | |
| Sch9 | CCH | CCH | CCH | CCH |
| Sch10 | | | | |
| Sch11 | | | | |
| Sch12 | | | | |
| Sch13 | | | | |
| Sch14 | | | | |
| Sch15 | | | | |
| Sch16 | | | | |
| Sch17 | CCH | CCH | CCH | CCH |

OPERATION FREQUENCY BAND OF BASE STATION 14-1 (8.1MHz)

OPERATION FREQUENCY BAND OF MOBILE STATION (8.1MHz)

OPERATION FREQUENCY BAND OF BASE STATION 14-2 (8.1MHz)

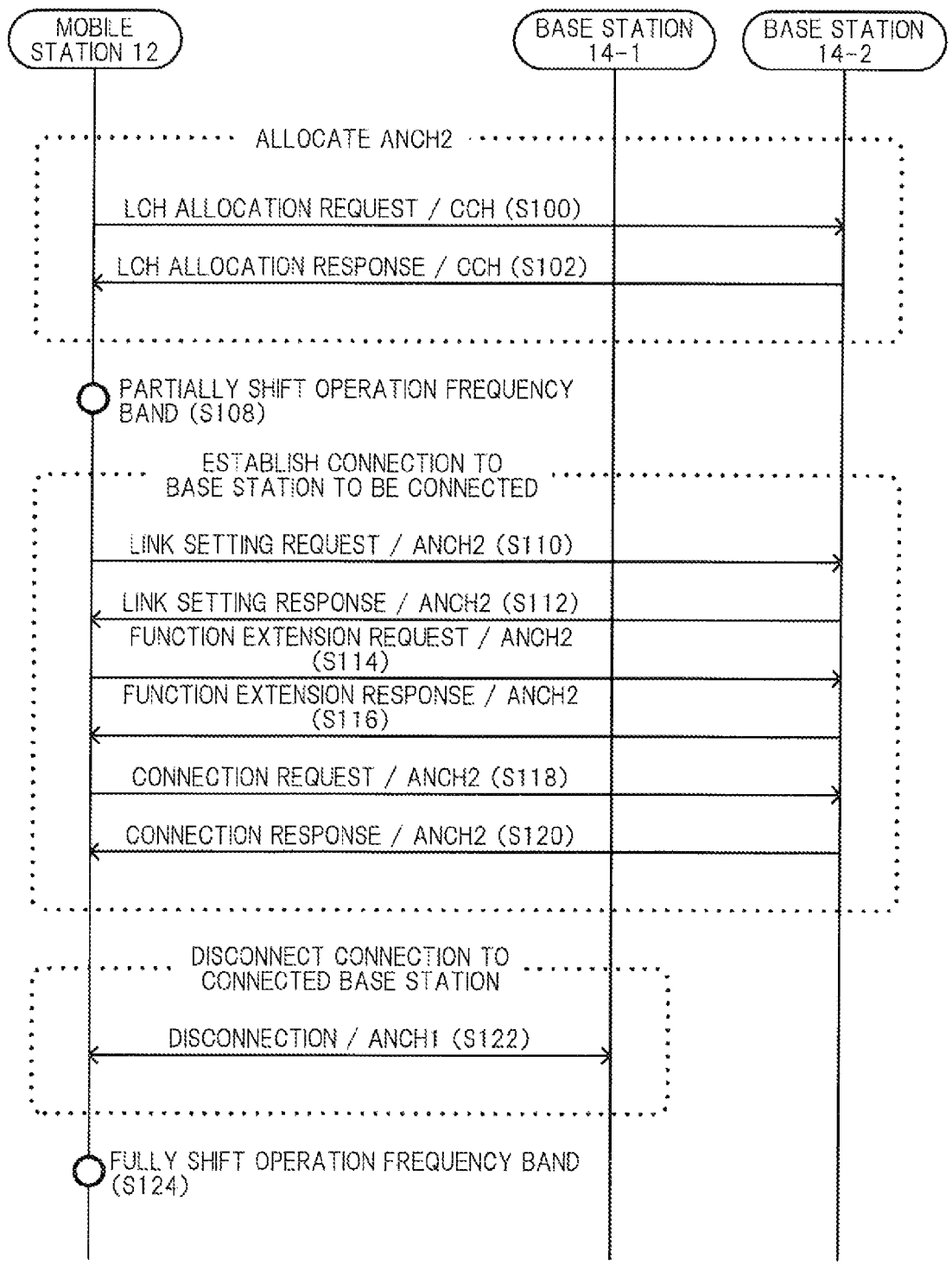

FIG.6A

|      | Slot1 | Slot2 | Slot3 | Slot4 |
|------|-------|-------|-------|-------|
| Sch1 | CCH   | CCH   | CCH   | CCH   |
| Sch2 | EXCH  | EXCH  | EXCH  | EXCH  |
| Sch3 | EXCH  | EXCH  | EXCH  | EXCH  |
| Sch4 |       | EXCH  | EXCH  | EXCH  |
| Sch5 |       |       | EXCH  | EXCH  |
| Sch6 | ANCH1 |       | EXCH  | EXCH  |
| Sch7 |       |       |       |       |
| Sch8 |       |       |       |       |
| Sch9 | CCH   | CCH   | CCH   | CCH   |
| Sch10 |      |       |       |       |
| Sch11 |      |       |       |       |
| Sch12 |      |       |       |       |
| Sch13 |      |       |       |       |
| Sch14 |      |       |       |       |
| Sch15 |      |       |       |       |
| Sch16 |      |       |       |       |
| Sch17 | CCH  | CCH   | CCH   | CCH   |

Sch1–Sch9: OPERATION FREQUENCY BAND OF CONNECTED BASE STATION

Sch1–Sch17: OPERATION FREQUENCY BAND OF MOBILE STATION

Sch9–Sch17: OPERATION FREQUENCY BAND OF BASE STATION TO BE CONNECTED

FIG.6B

| | Slot1 | Slot2 | Slot3 | Slot4 | |
|---|---|---|---|---|---|
| Sch1 | CCH | CCH | CCH | CCH | ↑ |
| Sch2 | EXCH | EXCH | EXCH | EXCH | |
| Sch3 | EXCH | EXCH | EXCH | EXCH | |
| Sch4 | | EXCH | EXCH | EXCH | OPERATION FREQUENCY BAND OF CONNECTED BASE STATION |
| Sch5 | | | EXCH | EXCH | |
| Sch6 | ANCH1 | | EXCH | EXCH | |
| Sch7 | | | | | |
| Sch8 | | | | | |
| Sch9 | CCH | CCH | CCH | CCH | ↓ |
| Sch10 | | | | | |
| Sch11 | | | | | |
| Sch12 | | ANCH2 | | | OPERATION FREQUENCY BAND OF BASE STATION TO BE CONNECTED |
| Sch13 | | | | | |
| Sch14 | | | | | |
| Sch15 | | | | | |
| Sch16 | | | | | |
| Sch17 | CCH | CCH | CCH | CCH | |

OPERATION FREQUENCY BAND OF MOBILE STATION (spans Sch1–Sch17)

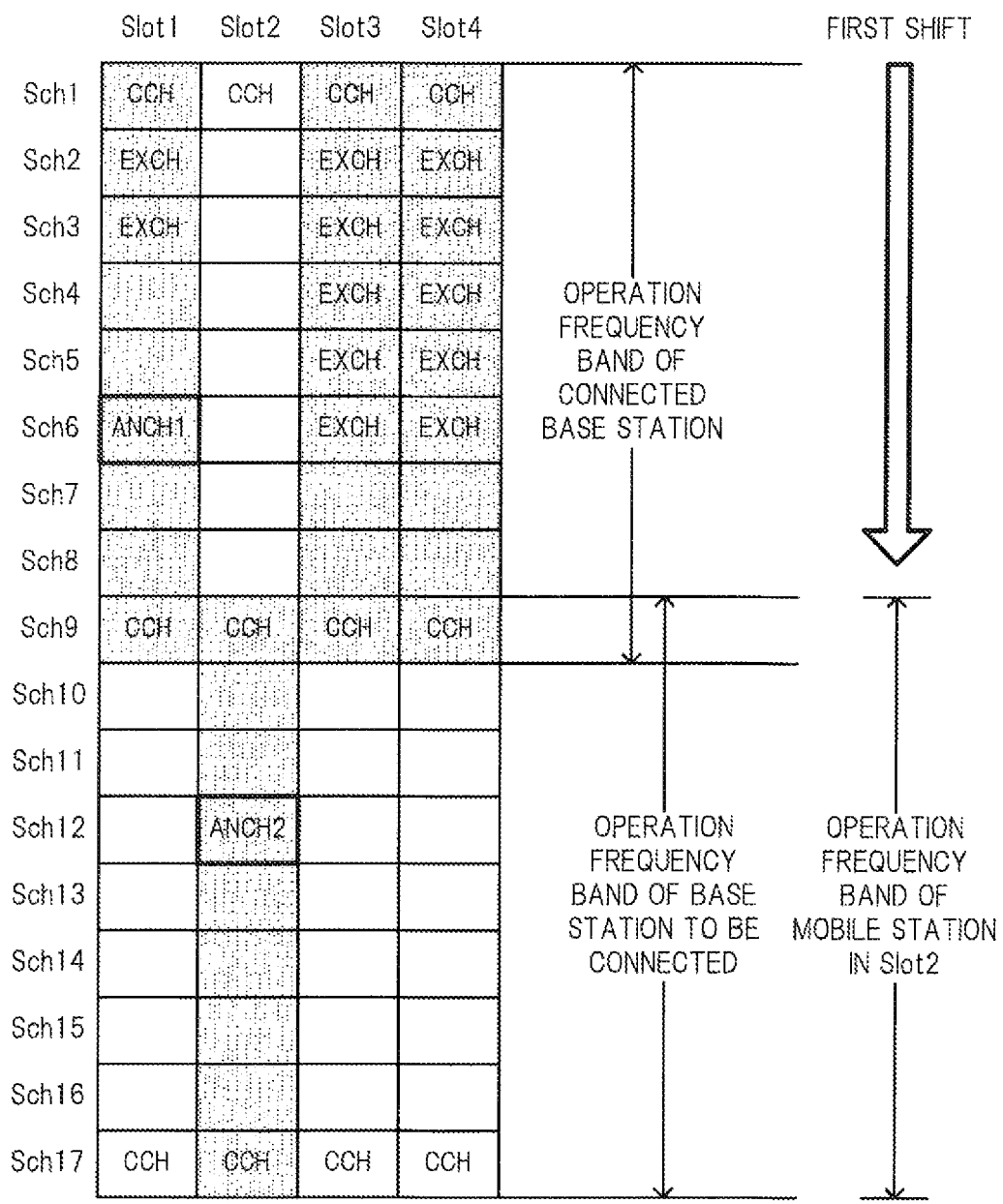

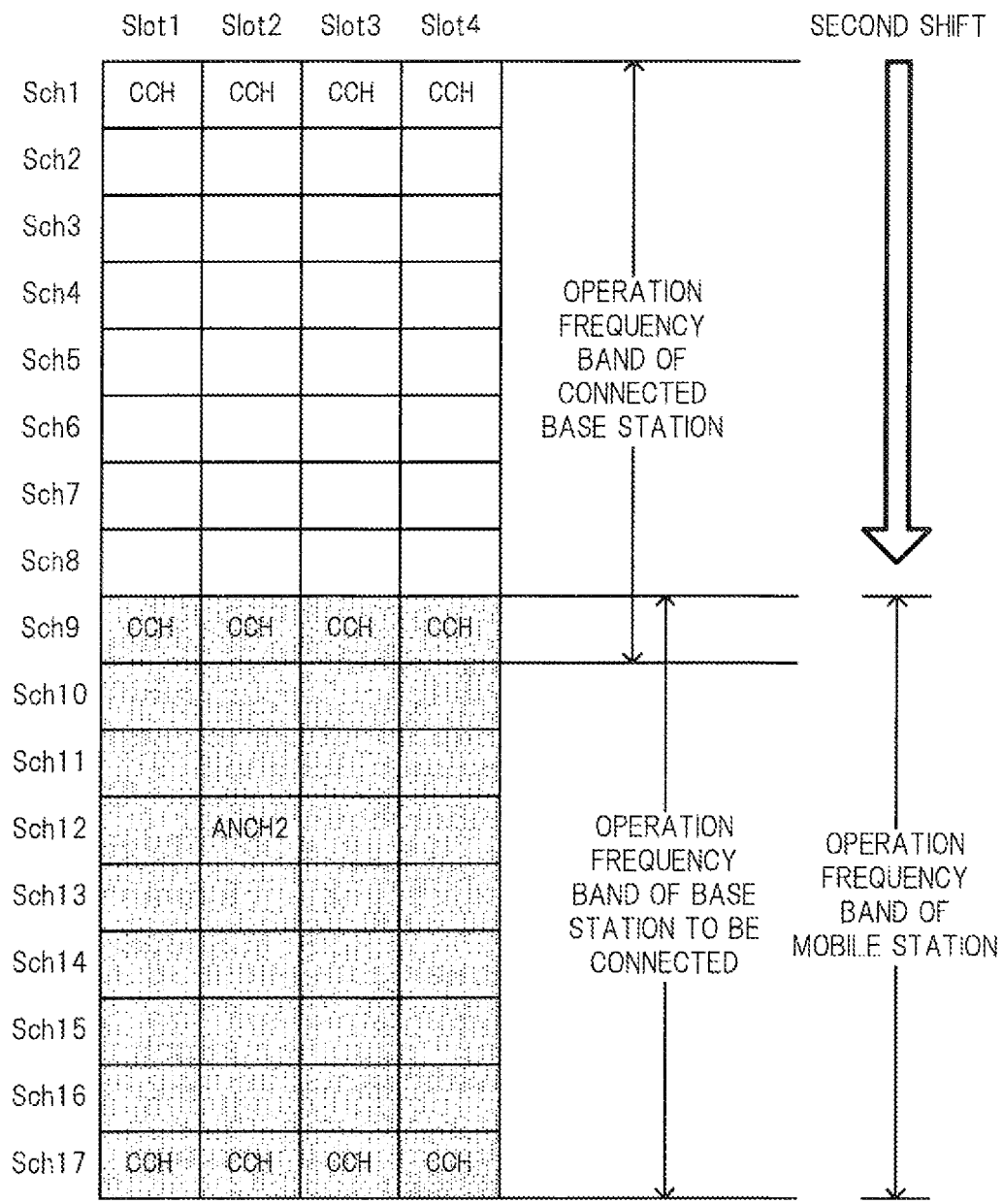

FIG.6E

|  | Slot1 | Slot2 | Slot3 | Slot4 | |
|---|---|---|---|---|---|
| Sch1 | CCH | CCH | CCH | CCH | |
| Sch2 | EXCH | EXCH | EXCH | EXCH | |
| Sch3 | EXCH | EXCH | EXCH | EXCH | |
| Sch4 |  | EXCH | EXCH | EXCH | OPERATION FREQUENCY BAND OF CONNECTED BASE STATION |
| Sch5 |  |  | EXCH | EXCH | |
| Sch6 | ANCH1 |  | EXCH | EXCH | |
| Sch7 |  |  |  |  | |
| Sch8 |  |  |  |  | |
| Sch9 | CCH | CCH | CCH | CCH | |
| Sch10 |  |  |  |  | |
| Sch11 |  |  |  |  | |
| Sch12 |  |  |  |  | OPERATION FREQUENCY BAND OF BASE STATION TO BE CONNECTED |
| Sch13 |  |  |  |  | |
| Sch14 |  |  |  |  | |
| Sch15 | ANCH2 |  |  |  | |
| Sch16 |  |  |  |  | |
| Sch17 | CCH | CCH | CCH | CCH | |

OPERATION FREQUENCY BAND OF MOBILE STATION

FIG.6F

| | Slot1 | Slot2 | Slot3 | Slot4 |
|---|---|---|---|---|
| Sch1 | CCH | CCH | CCH | CCH |
| Sch2 | | EXCH | EXCH | EXCH |
| Sch3 | | EXCH | EXCH | EXCH |
| Sch4 | | EXCH | EXCH | EXCH |
| Sch5 | | | EXCH | EXCH |
| Sch6 | ANCH1 | | EXCH | EXCH |
| Sch7 | | | | |
| Sch8 | | | | |
| Sch9 | CCH | CCH | CCH | CCH |
| Sch10 | | | | |
| Sch11 | | | | |
| Sch12 | | | | |
| Sch13 | | | | |
| Sch14 | | | | |
| Sch15 | ANCH2 | | | |
| Sch16 | | | | |
| Sch17 | CCH | CCH | CCH | CCH |

OPERATION FREQUENCY BAND OF CONNECTED BASE STATION

OPERATION FREQUENCY BAND OF BASE STATION TO BE CONNECTED

OPERATION FREQUENCY BAND OF MOBILE STATION IN Slot1

|  | Slot1 | Slot2 | Slot3 | Slot4 |
|---|---|---|---|---|
| Sch1 | CCH | CCH | CCH | CCH |
| Sch2 | EXCH | EXCH | EXCH | EXCH |
| Sch3 | EXCH | EXCH | EXCH | EXCH |
| Sch4 |  | EXCH | EXCH | EXCH |
| Sch5 |  |  | EXCH | EXCH |
| Sch6 | ANCH1 |  | EXCH | EXCH |
| Sch7 |  |  |  |  |
| Sch8 |  |  |  |  |
| Sch9 | CCH | CCH | CCH | CCH |
| Sch10 |  |  |  |  |
| Sch11 |  |  |  |  |
| Sch12 |  |  |  |  |
| Sch13 |  |  |  |  |
| Sch14 |  |  |  |  |
| Sch15 |  |  | ANCH2 |  |
| Sch16 |  |  |  |  |
| Sch17 | CCH | CCH | CCH | CCH |

OPERATION FREQUENCY BAND OF CONNECTED BASE STATION

OPERATION FREQUENCY BAND OF MOBILE STATION

OPERATION FREQUENCY BAND OF BASE STATION TO BE CONNECTED

FIG.6H

| | Slot1 | Slot2 | Slot3 | Slot4 |
|---|---|---|---|---|
| Sch1 | CCH | CCH | CCH | CCH |
| Sch2 | EXCH | EXCH | | EXCH |
| Sch3 | EXCH | EXCH | | EXCH |
| Sch4 | | EXCH | | EXCH |
| Sch5 | | | | EXCH |
| Sch6 | ANCH1 | | | EXCH |
| Sch7 | | | | |
| Sch8 | | | | |
| Sch9 | CCH | CCH | CCH | CCH |
| Sch10 | | | | |
| Sch11 | | | | |
| Sch12 | | | | |
| Sch13 | | | | |
| Sch14 | | | | |
| Sch15 | | | ANCH2 | |
| Sch16 | | | | |
| Sch17 | CCH | CCH | CCH | CCH |

FIRST SHIFT

OPERATION FREQUENCY BAND OF CONNECTED BASE STATION

OPERATION FREQUENCY BAND OF BASE STATION TO BE CONNECTED

OPERATION FREQUENCY BAND OF MOBILE STATION IN Slot3

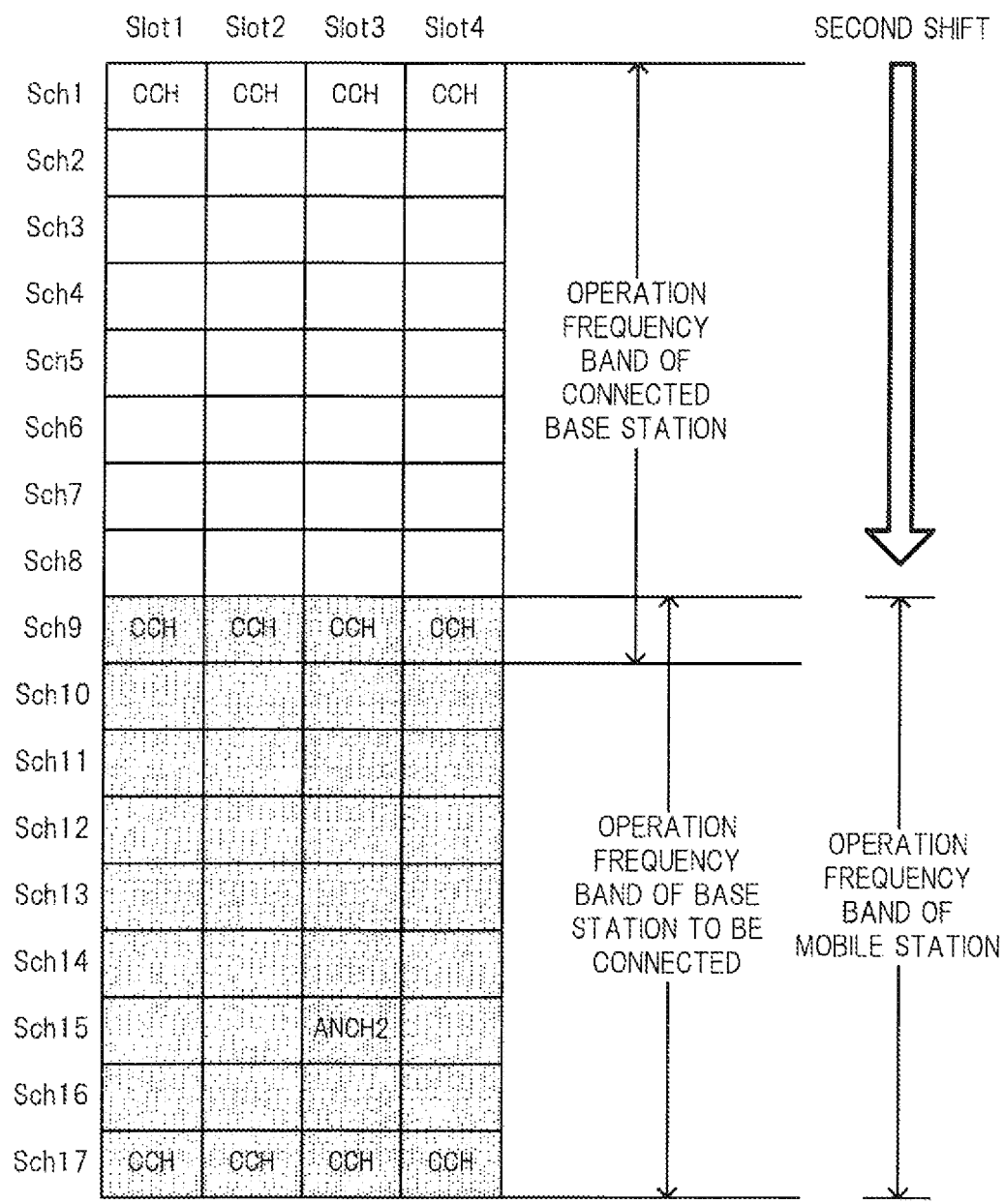

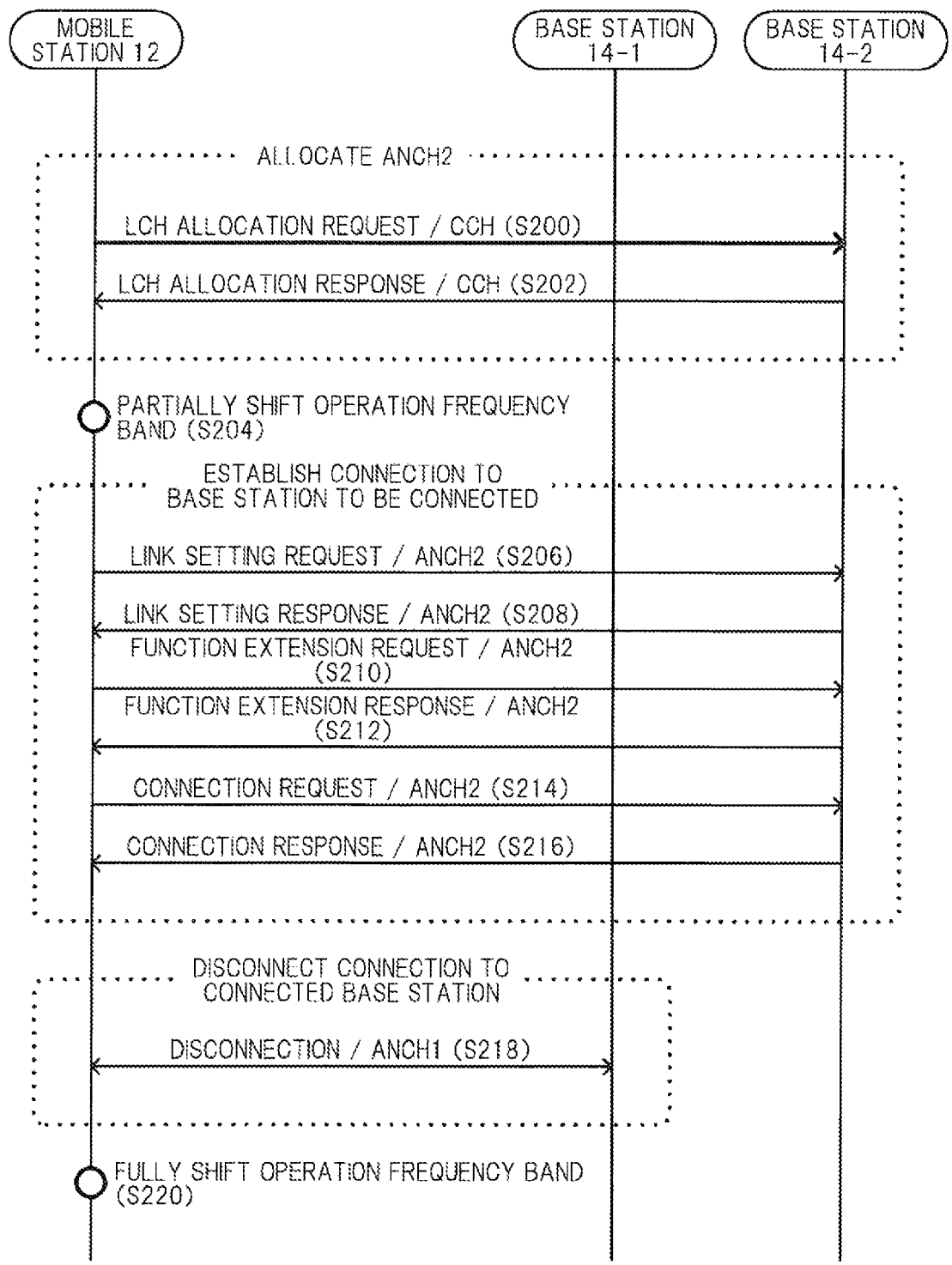

FIG.8A

|  | Slot1 | Slot2 | Slot3 | Slot4 |
|---|---|---|---|---|
| Sch1 | CCH | CCH | CCH | CCH |
| Sch2 | EXCH | EXCH | EXCH | EXCH |
| Sch3 | EXCH | EXCH | EXCH | EXCH |
| Sch4 |  | EXCH | EXCH | EXCH |
| Sch5 |  |  | EXCH | EXCH |
| Sch6 | ANCH1 |  | EXCH | EXCH |
| Sch7 |  |  |  |  |
| Sch8 |  |  |  |  |
| Sch9 | CCH | CCH | CCH | CCH |
| Sch10 |  |  |  |  |
| Sch11 |  |  |  |  |
| Sch12 |  |  |  |  |
| Sch13 |  |  |  |  |
| Sch14 |  |  |  |  |
| Sch15 |  |  |  |  |
| Sch16 |  |  |  |  |
| Sch17 | CCH | CCH | CCH | CCH |

Sch1–Sch9: OPERATION FREQUENCY BAND OF CONNECTED BASE STATION

Sch1–Sch17: OPERATION FREQUENCY BAND OF MOBILE STATION

Sch9–Sch17: OPERATION FREQUENCY BAND OF BASE STATION TO BE CONNECTED

FIG.8B

|  | Slot1 | Slot2 | Slot3 | Slot4 |
|---|---|---|---|---|
| Sch1 | CCH | CCH | CCH | CCH |
| Sch2 | EXCH | EXCH | EXCH | EXCH |
| Sch3 | EXCH | EXCH | EXCH | EXCH |
| Sch4 |  | EXCH | EXCH | EXCH |
| Sch5 |  |  | EXCH | EXCH |
| Sch6 | ANCH1 |  | EXCH | EXCH |
| Sch7 |  |  |  |  |
| Sch8 |  |  |  |  |
| Sch9 | CCH | CCH | CCH | CCH |
| Sch10 |  | ▨ | ▨ | ▨ |
| Sch11 |  |  |  |  |
| Sch12 |  |  |  |  |
| Sch13 |  |  |  |  |
| Sch14 |  |  |  |  |
| Sch15 |  |  |  |  |
| Sch16 |  |  |  |  |
| Sch17 | CCH | CCH | CCH | CCH |

OPERATION FREQUENCY BAND OF CONNECTED BASE STATION

OPERATION FREQUENCY BAND OF MOBILE STATION

OPERATION FREQUENCY BAND OF BASE STATION TO BE CONNECTED

FIG.8C

|       | Slot1 | Slot2 | Slot3 | Slot4 |
|-------|-------|-------|-------|-------|
| Sch1  | CCH   | CCH   | CCH   | CCH   |
| Sch2  | EXCH  | EXCH  | EXCH  | EXCH  |
| Sch3  | EXCH  | EXCH  | EXCH  | EXCH  |
| Sch4  |       | EXCH  | EXCH  | EXCH  |
| Sch5  |       |       | EXCH  | EXCH  |
| Sch6  | ANCH1 |       | EXCH  | EXCH  |
| Sch7  |       |       |       |       |
| Sch8  |       |       |       |       |
| Sch9  | CCH   | CCH   | CCH   | CCH   |
| Sch10 |       | ANCH2 |       |       |
| Sch11 |       |       |       |       |
| Sch12 |       |       |       |       |
| Sch13 |       |       |       |       |
| Sch14 |       |       |       |       |
| Sch15 |       |       |       |       |
| Sch16 |       |       |       |       |
| Sch17 | CCH   | CCH   | CCH   | CCH   |

Sch1–Sch9: OPERATION FREQUENCY BAND OF CONNECTED BASE STATION

Sch1–Sch9 (extended): OPERATION FREQUENCY BAND OF MOBILE STATION

Sch9–Sch17: OPERATION FREQUENCY BAND OF BASE STATION TO BE CONNECTED

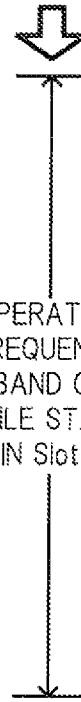

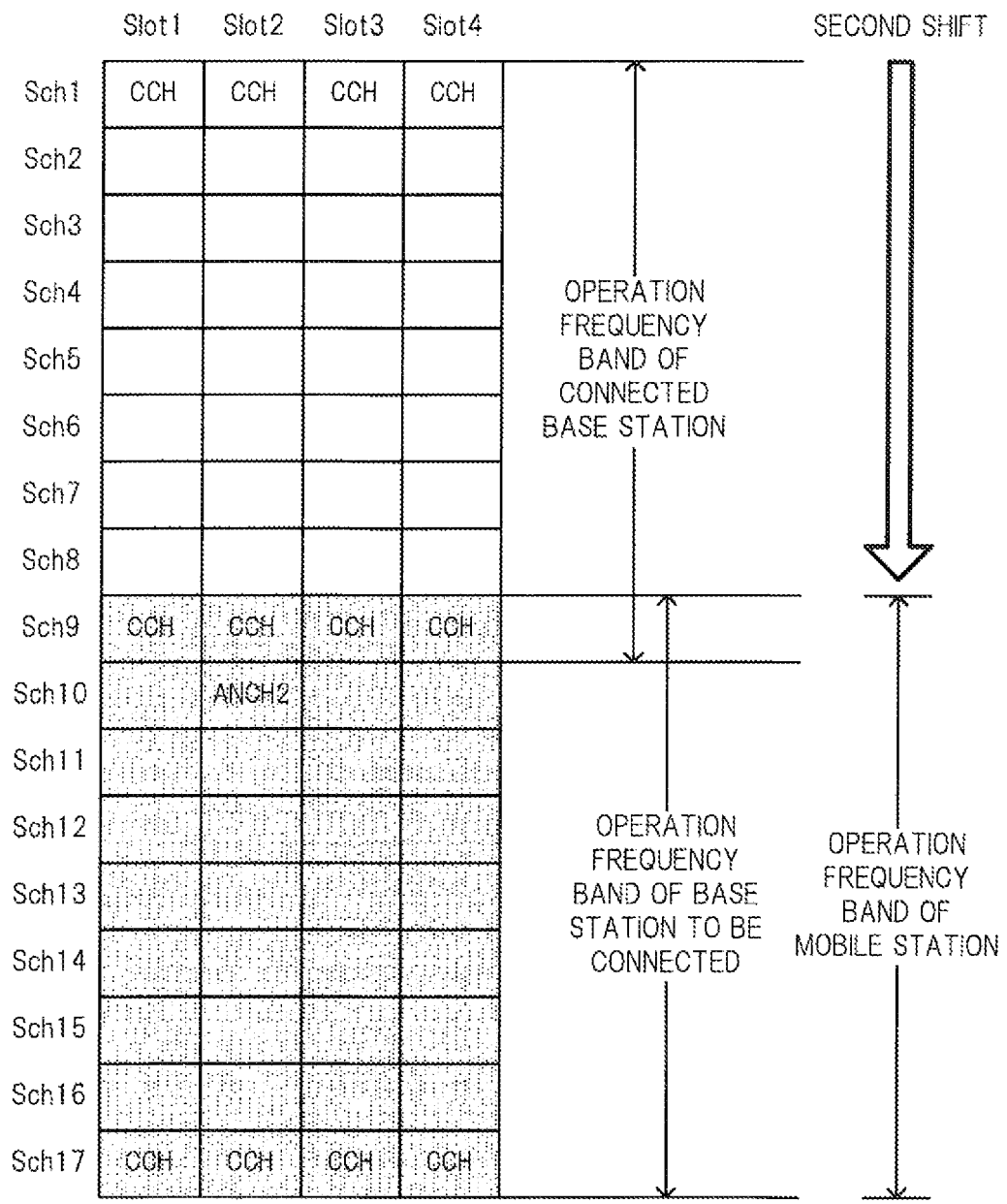

FIG.10A

|  | Slot1 | Slot2 | Slot3 | Slot4 |
|---|---|---|---|---|
| Sch1 | CCH | CCH | CCH | CCH |
| Sch2 | EXCH | EXCH | EXCH | EXCH |
| Sch3 | EXCH | EXCH | EXCH | EXCH |
| Sch4 |  | EXCH | EXCH | EXCH |
| Sch5 |  | ANCH1 | EXCH | EXCH |
| Sch6 |  |  | EXCH | EXCH |
| Sch7 |  |  |  |  |
| Sch8 |  |  |  |  |
| Sch9 | CCH | CCH | CCH | CCH |
| Sch10 |  |  |  |  |
| Sch11 |  |  |  |  |
| Sch12 |  |  |  |  |
| Sch13 |  |  |  |  |
| Sch14 |  |  |  |  |
| Sch15 |  |  |  |  |
| Sch16 |  |  |  |  |
| Sch17 | CCH | CCH | CCH | CCH |

Sch1–Sch9: OPERATION FREQUENCY BAND OF CONNECTED BASE STATION

Sch9–Sch17: OPERATION FREQUENCY BAND OF BASE STATION TO BE CONNECTED

OPERATION FREQUENCY BAND OF MOBILE STATION (spans Sch1–Sch17)

FIG.10B

| | Slot1 | Slot2 | Slot3 | Slot4 | |
|---|---|---|---|---|---|
| Sch1 | CCH | CCH | CCH | CCH | |
| Sch2 | EXCH | EXCH | EXCH | EXCH | |
| Sch3 | EXCH | EXCH | EXCH | EXCH | |
| Sch4 | | EXCH | EXCH | EXCH | |
| Sch5 | | ANCH1 | EXCH | EXCH | |
| Sch6 | | | EXCH | EXCH | |
| Sch7 | | | | | |
| Sch8 | | | | | |
| Sch9 | CCH | CCH | CCH | CCH | |
| Sch10 | | | | | |
| Sch11 | | | | | |
| Sch12 | | | | | |
| Sch13 | | | | | |
| Sch14 | | ANCH2 | | | |
| Sch15 | | | | | |
| Sch16 | | | | | |
| Sch17 | CCH | CCH | CCH | CCH | |

OPERATION FREQUENCY BAND OF CONNECTED BASE STATION

OPERATION FREQUENCY BAND OF MOBILE STATION

OPERATION FREQUENCY BAND OF BASE STATION TO BE CONNECTED

FIG.10C

| | Slot1 | Slot2 | Slot3 | Slot4 |
|---|---|---|---|---|
| Sch1 | CCH | CCH | CCH | CCH |
| Sch2 | EXCH | | EXCH | EXCH |
| Sch3 | EXCH | | EXCH | EXCH |
| Sch4 | | | EXCH | EXCH |
| Sch5 | | ANCH1 | EXCH | EXCH |
| Sch6 | | | EXCH | EXCH |
| Sch7 | | | | |
| Sch8 | | | | |
| Sch9 | CCH | CCH | CCH | CCH |
| Sch10 | | | | |
| Sch11 | | | | |
| Sch12 | | | | |
| Sch13 | | | | |
| Sch14 | | ANCH2 | | |
| Sch15 | | | | |
| Sch16 | | | | |
| Sch17 | CCH | CCH | CCH | CCH |

OPERATION FREQUENCY BAND OF CONNECTED BASE STATION

✗

OPERATION FREQUENCY BAND OF BASE STATION TO BE CONNECTED

OPERATION FREQUENCY BAND OF MOBILE STATION IN Slot2

FIG.10D

| | Slot1 | Slot2 | Slot3 | Slot4 | |
|---|---|---|---|---|---|
| Sch1 | CCH | CCH | CCH | CCH | ↑ ↑|
| Sch2 | EXCH | EXCH | EXCH | EXCH | | |
| Sch3 | EXCH | EXCH | EXCH | EXCH | | |
| Sch4 | | EXCH | EXCH | EXCH | OPERATION | OPERATION |
| Sch5 | | ANCH1 | EXCH | EXCH | FREQUENCY BAND OF | FREQUENCY BAND OF |
| Sch6 | | | EXCH | EXCH | CONNECTED BASE STATION | MOBILE STATION |
| Sch7 | | | | | | |
| Sch8 | | | | | ↓ | |
| Sch9 | CCH | CCH | CCH | CCH | ↑ | |
| Sch10 | | | | | | |
| Sch11 | | | | | | |
| Sch12 | | | | | OPERATION | |
| Sch13 | | | | | FREQUENCY BAND OF BASE | |
| Sch14 | | ANCH2 | | | STATION TO BE CONNECTED | |
| Sch15 | | | | | | |
| Sch16 | | | | | | |
| Sch17 | CCH | CCH | CCH | CCH | ↓ | |

FIG.10E

| | Slot1 | Slot2 | Slot3 | Slot4 |
|---|---|---|---|---|
| Sch1 | CCH | CCH | CCH | CCH |
| Sch2 | EXCH | EXCH | EXCH | EXCH |
| Sch3 | EXCH | EXCH | EXCH | EXCH |
| Sch4 | | EXCH | EXCH | EXCH |
| Sch5 | | | EXCH | EXCH |
| Sch6 | ANCH1 | | EXCH | EXCH |
| Sch7 | | | | |
| Sch8 | | | | |
| Sch9 | CCH | CCH | CCH | CCH |
| Sch10 | | | | |
| Sch11 | | | | |
| Sch12 | | | | |
| Sch13 | | | | |
| Sch14 | | ANCH2 | | |
| Sch15 | | | | |
| Sch16 | | | | |
| Sch17 | CCH | CCH | CCH | CCH |

OPERATION FREQUENCY BAND OF CONNECTED BASE STATION

OPERATION FREQUENCY BAND OF MOBILE STATION

OPERATION FREQUENCY BAND OF BASE STATION TO BE CONNECTED

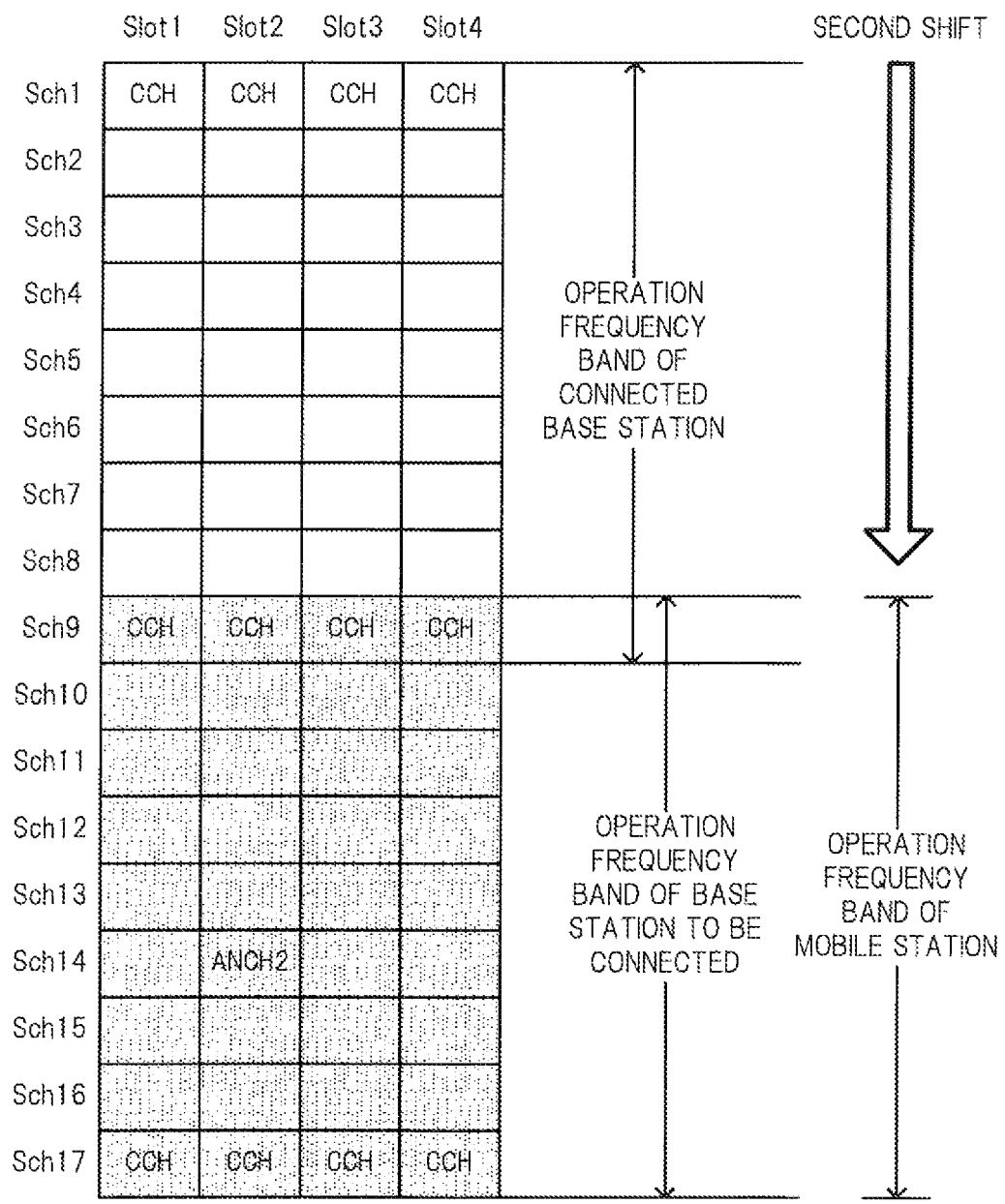

MOBILE COMMUNICATION SYSTEM, MOBILE STATION, BASE STATION, AND HANDOVER METHOD

TECHNICAL FIELD

The present invention relates to a mobile communication system, a mobile station, a base station, and a handover method.

BACKGROUND ART

In the mobile communication system, a handover, in which a mobile station switches a connection destination from one base station to another base station due to a travel between cells or degradation of communication quality, is carried out. A handover, which can smoothly switch between communication destinations while a communication state of an application is maintained, is specifically referred to as seamless handover.

The seamless handover is defined in the eXtended Global Platform (XGP) known as a next-generation PHS (refer to Non Patent Literature 1).

CITATION LIST

Non Patent Literature

[NPL 1]: ARIB STD-195 Version 1.2 "OFDMA/TDMA TDD Broadband Wireless Access System (Next Generation-PHS)", Mar. 18, 2009, Association of Radio Industries and Businesses.

SUMMARY OF INVENTION

Problems to be Solved by the Invention

It is generally necessary in the seamless handover for the mobile station to carry out wireless communication simultaneously to/from both a connected base station and a base station to be connected in order to avoid a disruption of data communication (in order to maintain the communication state of the application).

However, Sometimes different operation frequency bands are set to base stations close to each other may be different in order to avoid interference in the mobile communication system such as the XGP. In this case, it is not easy for the mobile station, which is limited in an available frequency band width, to carry out the wireless communication simultaneously with both the connected base station and the base station to be connected in the handover.

The present invention is has been made in view of the above-mentioned problem, and has an object of providing a mobile communication system, a mobile station, a base station, and a handover method which can realize the seamless handover between base stations using frequency bands different from each other.

Solution to Problem

In order to solve the above-mentioned problem, according to the present invention, there is provided a mobile communication system employing a time-division multiple-access scheme, including: a first base station which uses a first frequency band; a second base station which uses a second frequency band different from the first frequency band; and a mobile station to which a first control channel belonging to the first frequency band is allocated by the first base station, the mobile station connected to the first base station having a operation frequency band which contains the first frequency band and a common channel defined on an end on a side of the first frequency band in the second frequency band, in which: the second base station includes: control channel determination means for determining a second control channel in the second frequency band to be allocated to the mobile station in response to a start of a handover by the mobile station from the first base station to the second base station; and means for notifying, via the common channel, the mobile station of the second control channel determined by the control channel determination means; the mobile station includes: frequency band shift means for shifting, when a timeslot of the second control channel notified by the second base station is different from a timeslot of the first control channel, the operation frequency band of the mobile station in the timeslot of the second control channel to a frequency band containing the second control channel; and means for establishing a connection to the second base station via the second control channel after the operation frequency band of the mobile station in the timeslot of the second control channel is shifted; and the frequency band shift means shifts the operation frequency band of the mobile station to the second frequency band after the connection to the second base station is established.

According to the present invention, when the mobile station carries out the handover from the first base station to the second base station, the operation frequency band of the mobile station is not switched directly from the first frequency band used by the first base station to the second frequency band used by the second base station, but the operation frequency band of the mobile station is shifted through two stages using the common channel defined on the end on the side of the first frequency band in the second frequency band. On this occasion, the operation frequency band of the mobile station connected to the first base station contains the first frequency band and the common channel.

In other words, when the timeslot of the second control channel notified via the common channel by the second base station (base station to be connected) is different from the timeslot of the first control channel allocated by the first base station (connected base station), the mobile station first shifts the frequency band of the mobile station in the timeslot of the second control channel from the frequency band containing the first frequency band and the common channel to the frequency band containing the second control channel (first shift).

On this occasion, the operation frequency band of the mobile station in the timeslot of the second control channel exists in the frequency band containing the second control channel, and the operation frequency band of the mobile station in timeslots different from the timeslot of the second control channel exists in a frequency band (first frequency band) containing the first control channel. Therefore, the mobile station can carry out wireless communication simultaneously both to/from the first and second base stations respectively via the first and second control channels. Then, the mobile station establishes a connection to the second base station via the second control channel after the first shift. During this period, the mobile station maintains data communication via the first control channel allocated by the first base station.

When the connection between the mobile station and the second base station is established, the mobile station completely shifts the frequency band of the mobile station to the second frequency band (second shift). Then, the mobile station disconnects the connection to the first base station, and continues the data communication via the second control channel allocated by the second base station and the like. In this way, the mobile station completes the handover from the first base station to the second base station without disconnection of the data communication.

In this way, according to the present invention, a seamless handover between the base stations for respectively using difference frequency bands can be realized.

Further, according to an aspect of the present invention, the frequency band shift means may shift, when the timeslot of the second control channel notified by the second base station is different from the timeslot of the first control channel, the operation frequency band of the mobile station in the timeslot of the second control channel so that an end on a side of the second frequency band in the operation frequency band of the mobile station is equal to a frequency of the second control channel.

According to this aspect, a shift amount (first shift amount) of the operation frequency band of the mobile station is minimized in the timeslot of the second control channel, and when the first base station has allocated communication channels belonging to the timeslot of the second control channel to the mobile station, the number of communication channels released by the first shift can be reduced. As a result, a more seamless handover can be realized.

Further, according to another aspect of the present invention, the mobile station may include reallocation request means for requesting, when the timeslot of the second control channel notified by the second base station is the same as the timeslot of the first control channel, the second base station to reallocate a control channel via the common channel so that the timeslots are different from each other, and the control channel determination means may determine a new second control channel in the second frequency band, different from the second control channel had notified to the mobile station in response to the reallocation request for the control channel from the mobile station.

According to this aspect, even when the timeslot of the second control channel notified via the common channel by the second base station is the same as the timeslot of the first control channel allocated by the first base station, these timeslots are caused to be different from each other by the reallocation of the second control channel. Therefore, a seamless handover between the base stations for respectively using difference frequency bands can be realized.

Further, according to still another aspect of the present invention, the mobile station may further include means for notifying the second base station of identification information indicating the timeslot of the first control channel via the common channel when the mobile station starts the handover from the first base station to the second base station, and the control channel determination means may determine the second control channel of available channels belonging to a timeslot different from the timeslot of the first control channel based on the identification information notified by the mobile station.

According to this aspect, it is possible to prevent the timeslot of the second control channel notified via the common channel by the second base station from coinciding with the timeslot of the first control channel allocated by the first base station.

Further, according to yet another aspect of the present invention, the control channel determination means may determine, as the second control channel, an available channel having a frequency closest to a frequency of the first control channel of the available channels belonging to the timeslot different from the timeslot of the first control channel based on the identification information notified by the mobile station.

According to this aspect, a shift amount (first shift amount) of the operation frequency band of the mobile station can be reduced in the timeslot of the second control channel, and when the first base station has allocated communication channels belonging to the timeslot of the second control channel to the mobile station, the number of communication channels released by the first shift can be reduced. As a result, a more seamless handover can be realized.

Further, according to the present invention, there is provided a mobile station for carrying out a handover from a first base station, which uses a first frequency band, to a second base station, which uses a second frequency band different from the first frequency band, the mobile station connected to the first base station having a operation frequency band which contains the first frequency band and a common channel defined on an end on a side of the first frequency band in the second frequency band, the mobile station including: frequency band shift means for shifting, when a timeslot of a first control channel which belongs to the first frequency band allocated by the first base station is different from a timeslot of a second control channel which belongs to the second frequency band and is notified by the second base station via the common channel in response to a start of the handover, the operation frequency band of the mobile station in the timeslot of the second control channel to a frequency band containing the second control channel; and means for establishing a connection to the second base station via the second control channel after the operation frequency band of the mobile station in the timeslot of the second control channel is shifted, in which the frequency band shift means shifts the operation frequency band of the mobile station to the second frequency band after the connection to the second base station is established.

Further, according to the present invention, there is provided a base station, which uses a second frequency band different from a first frequency band used by another base station, the another base station being connected to a mobile station having a operation frequency band which contains the first frequency band and a common channel defined on an end on a side of the first frequency band in the second frequency band, the base station including: control channel determination means for determining a second control channel in the second frequency band to be allocated to the mobile station in response to a start of a handover from the another base station to the base station by the mobile station to which a first control channel belonging to the first frequency band is allocated by the another base station; means for notifying, via the common channel, the mobile station of the second control channel determined by the control channel determination means; and means for establishing a connection to the mobile station via the second control channel after the operation frequency band of the mobile station in a timeslot of the second control channel is shifted to a frequency band containing the second control channel.

Further, according to the present invention, there is provided a handover method for use in a mobile communication system, the mobile communication system including: a first base station, which uses a first frequency band; a second base station, which uses a second frequency band different from the first frequency band; and a mobile station to which a first control channel belonging to the first frequency band is allocated by the first base station, the mobile station connected to the first base station having a operation frequency band which contains the first frequency band and a common channel defined on an end on a side of the first frequency band in the second frequency band, the handover method including: a control channel determination step of determining, by the second base station, a second control channel in the second frequency band to be allocated to the mobile station in response to a start of a handover by the mobile station from the first base station to the second base station; a step of notifying, by the second base station, via the common channel, the mobile station of the second control channel determined in the control channel determination step; a step of shifting, when a timeslot of the second control channel notified by the second base station is different from a times lot of the first control channel, the operation frequency band of the mobile station in the timeslot of the second control channel to a frequency band containing the second control channel; a step of establishing, by the mobile station, a connection to the second base station via the second control channel after the operation frequency band of the mobile station in the timeslot of the second control channel is shifted; and a step of shifting the operation frequency band of the mobile station to the second frequency band after the connection between the mobile station and the second base station is established.

BRIEF DESCRIPTION OF DRAWINGS

[FIG. 2A] A diagram illustrating a wireless channel configuration of the mobile communication system according to the first to third embodiments.

[FIG. 2B] A diagram illustrating operation frequency bands of base stations and a operation frequency band of a mobile station in the wireless communication configuration illustrated in FIG. 2A.

[FIG. 5A] A sequence diagram illustrating an example of a handover method according to the first embodiment.

[FIG. 6A] A diagram illustrating an example of a relationship among operation frequency bands of a connected base station and a base station to be connected, a operation frequency band of the mobile station, and PRUs (ANCH1 and EXCHs) allocated by the connected base station to the mobile station.

[FIG. 6B] A diagram illustrating a PRU (ANCH2) allocated by the base station to be connected to the mobile station after the state illustrated in FIG. 6A.

[FIG. 6C] A diagram illustrating the operation frequency band of the mobile station in Slot2 shifted to the operation frequency band of the base station to be connected (first shift) after the state illustrated in FIG. 6B.

[FIG. 6D] A diagram illustrating the operation frequency band of the mobile station completely shifted to the operation frequency band of the base station to be connected (second shift) after the connection between the mobile station and the base station to be connected is established in the state illustrated in FIG. 6C.

[FIG. 6E] A diagram illustrating an ANCH2 allocated by the base station to be connected to the mobile station after the state illustrated in FIG. 6A.

[FIG. 6F] A diagram illustrating that the operation frequency band of the mobile station in Slot1 cannot be shifted to a frequency band containing both the ANCH1 and the ANCH2 after the state illustrated in FIG. 6E.

[FIG. 6G] A diagram illustrating an ANCH2 newly allocated by the base station to be connected in response to a reallocation request for the ANCH2 from the mobile station after the state illustrated in FIG. 6E.

[FIG. 6H] A diagram illustrating the operation frequency band of the mobile station in Slot3 shifted to the operation frequency band of the base station to be connected (first shift) after the state illustrated in FIG. 6G.

[FIG. 6I] A diagram illustrating the operation frequency band of the mobile station completely shifted to the operation frequency band of the base station to be connected (second shift) after the connection between the mobile station and the base station to be connected is established in the state illustrated in FIG. 6H.

[FIG. 7] A sequence diagram illustrating an example of the handover method according to the second embodiment.

[FIG. 8A] A diagram illustrating an example of a relationship among the operation frequency bands of the connected base station and the base station to be connected, the operation frequency band of the mobile station, and PRUs (ANCH1 and EXCHs) allocated by the connected base station to the mobile station.

[FIG. 8B] A diagram illustrating an extent of PRUs to be allocated as a new ANCH2 by the base station to be connected to the mobile station in the state illustrated in FIG. 8A.

[FIG. 8C] A diagram illustrating an ANCH2 allocated by the base station to be connected to the mobile station after the state illustrated in FIG. 8A.

[FIG. 8D] A diagram illustrating the operation frequency band of the mobile station in Slot2 shifted to a frequency band containing the ANCH2 (first shift) after the state illustrated in FIG. 8C.

[FIG. 8E] A diagram illustrating the operation frequency band of the mobile station completely shifted to the operation frequency band of the base station to be connected (second shift) after the connection between the mobile station and the base station to be connected is established in the state illustrated in FIG. 8D.

[FIG. 10A] A diagram illustrating an example of a relationship among the operation frequency bands of the connected base station and the base station to be connected, the operation frequency band of the mobile station, and PRUs (ANCH1 and EXCHs) allocated by the connected base station to the mobile station.

[FIG. 10B] A diagram illustrating a PRU (ANCH2) allocated by the base station to be connected to the mobile station after the state illustrated in FIG. 10A.

[FIG. 10C] A diagram illustrating that the operation frequency band of the mobile station in Slot2 cannot be shifted to a frequency band containing both the ANCH1 and the ANCH2 after the state illustrated in FIG. 10B.

[FIG. 10D] A diagram illustrating an extent of PRUs to be allocated as a new ANCH1 by the connected base station to the mobile station in the state illustrated in FIG. 10B.

[FIG. 10E] A diagram illustrating an ANCH1 newly allocated by the connected base station in response to a reallocation request for the ANCH1 from the mobile station after the state illustrated in FIG. 10B.

[FIG. 10G] A diagram illustrating the operation frequency band of the mobile station completely shifted to the operation frequency band of the base station to be connected (second shift) after the connection between the mobile station and the base station to be connected is established in the state illustrated in FIG. 10F.

DESCRIPTION OF EMBODIMENTS

Figure 1:
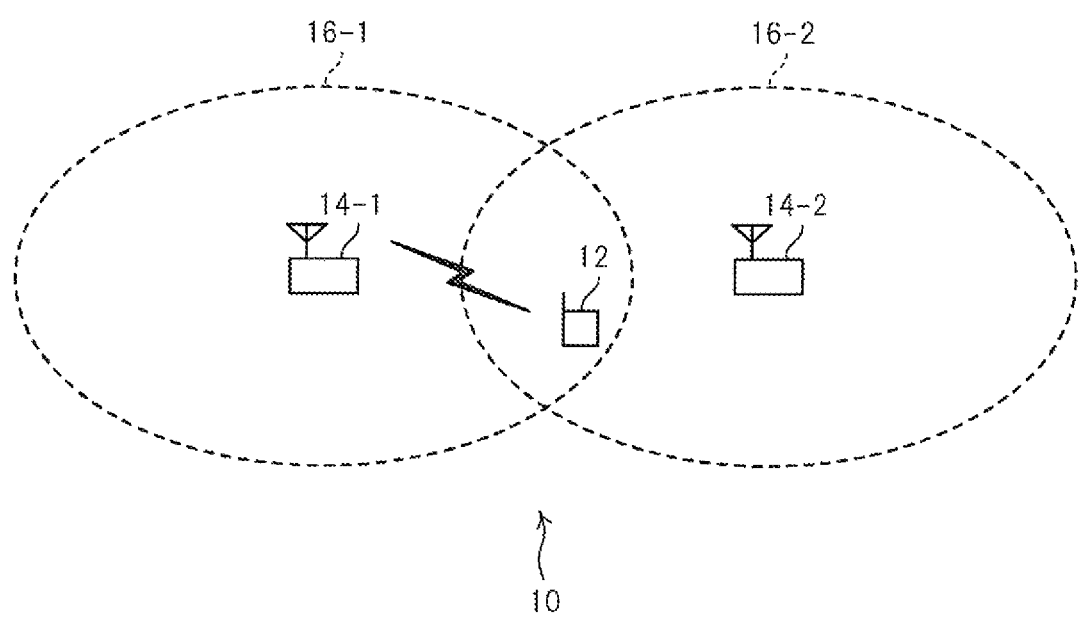
[FIG. 1] A diagram illustrating a configuration of a mobile communication system according to first to third embodiments of the present invention.

A detailed description is now given of first to third embodiments of the present invention referring to the drawings.

First Embodiment

FIG. 1 is a diagram illustrating a configuration of a mobile communication system 10 according to the first embodiment of the present invention. The mobile communication system 10 includes a plurality of mobile stations 12 (only one of them is illustrated), and a plurality of base stations 14 (only close base stations 14-1 and 14-2 are illustrated) as illustrated in FIG. 1. On this occasion, a cell 16-1 of the base station 14-1 and a cell 16-2 of the base station 14-2 partially overlap each other.

Each of the base stations 14 wirelessly communicates to/from respective mobile stations 12 located in the own cells 16 by using the orthogonal frequency division multiple access (OFDMA) scheme and the time division multiple access/time division duplex (TDMA/TDD) scheme.

FIG. 2A is a diagram illustrating a wireless channel configuration in the mobile communication system 10. As illustrated in FIG. 2A, a TDMA frame having a predetermined time width (5 ms here) is divided into an uplink subframe (2.5 ms) and a downlink subframe (2.5 ms) in the mobile communication system 10. Further, each of the subframes is equally divided into a plurality of timeslots (Slot1 to Slot4 here). Moreover, a plurality of OFDMA sub-channels (Sch1 to Sch17 here) are defined in a predetermined frequency band. The minimum unit of the wireless channel allocated by the base station 14 to the mobile station 12 is referred to as physical resource unit (PRU). Each of the PRUs belongs to any of the timeslots (Slot1 to Slot4) and any of the sub-channels (Sch1 to Sch17). Each of the PRUs is identified by a PRU number, for example (1, 2, 3, ... ) starting from 1, in both the uplink subframe and the downlink subframe. PRUs having the same PRU number are used as a pair for the uplink and downlink. In other words, the PRUs are symmetrically allocated in terms of the uplink and downlink.

Different operation frequency bands are set to base stations 14 close to one another in order to avoid interference in the mobile communication system 10. On this occasion, as illustrated in FIG. 2B, sub-channels Sch1 to Sch9 (width: 8.1 MHz) are set as a operation frequency band of the base station 14-1, and sub-channels Sch9 to Sch17 (width: 8.1 MHz) are set as a operation frequency band of the base station 14-2.

Sch1, Sch9, and Sch17 of those sub-channels are defined as common channels (CCHs) shared by at least one mobile station 12. This is a wireless channel configuration referred to as "dual CCH" which arranges two sub-channels for the CCH in the operation frequency band of each base station 14 in order to increase a reception gain of the CCH. Therefore, the operation frequency band of the base station 14-1 and the operation frequency band of the base station 14-2 overlap each other at Sch9 defined as the CCH.

On the other hand, PRUs belonging to Sch2 to Sch8 and Sch10 to Sch16 are used as individual channels (ICHs) individually allocated to each of the mobile stations 12. The ICHs include anchor channels (ANCHs) one of which in principle is allocated as an individual control channel to each of the mobile stations 12 and is mainly used for transmitting control information, and extra channels (EXCHs) at least one of which is allocated to each of the mobile stations 12 and is mainly used for transmission of communication data. It should be noted that the base station 14 can change, for every frame or every plurality of frames, the PRU (particularly EXCH) allocated as an ICH to the mobile station 12.

Moreover, the frequency band available for the mobile station is limited to a frequency band corresponding to the nine sub-channels (8.1 MHz), which is the same as the operation frequency bands of the base stations 14-1 and 14-2. Therefore, when the mobile station 12 connects to the base station 14-1, the operation frequency band of the mobile station 12 is set to sub-channels Sch1 to Sch9, which correspond to the operation frequency band of the base station 14-1. Moreover, when the mobile station 12 connects to the base station 14-2, the operation frequency band of the mobile station 12 is set to sub-channels Sch9 to Sch17, which correspond to the operation frequency band of the base station 14-2. The operation frequency band of the base station 14-1 and the operation frequency band of the base station 14-2 overlap at the CCH (Sch9), and the operation frequency band of the mobile station 12 connecting to the base station 14-1 contains the CCH (Sch9) located at a top end (end on a side of the operation frequency band of the base station 14-1) of the operation frequency band of the base station 14-2.

When the mobile station 12 carries out a handover from the base station 14-1 to the base station 14-2 in the mobile communication system 10, the operation frequency band of the mobile station is not directly switched from sub-channels Sch1 to Sch9, which correspond to the operation frequency band of the base station 14-1, to sub-channels Sch9 to Sch17, which correspond to the operation frequency band of the base station 14-2, but the operation frequency band of the mobile station 12 is shifted through two stages using the CCH (Sch9) where the operation frequency band of the base station 14-1 and the operation frequency band of the base station 14-2 overlap each other. As a result, the mobile station 12 can carry out a seamless handover between the base stations 14-1 and 14-2 which use the different frequency bands.

Figure 3:
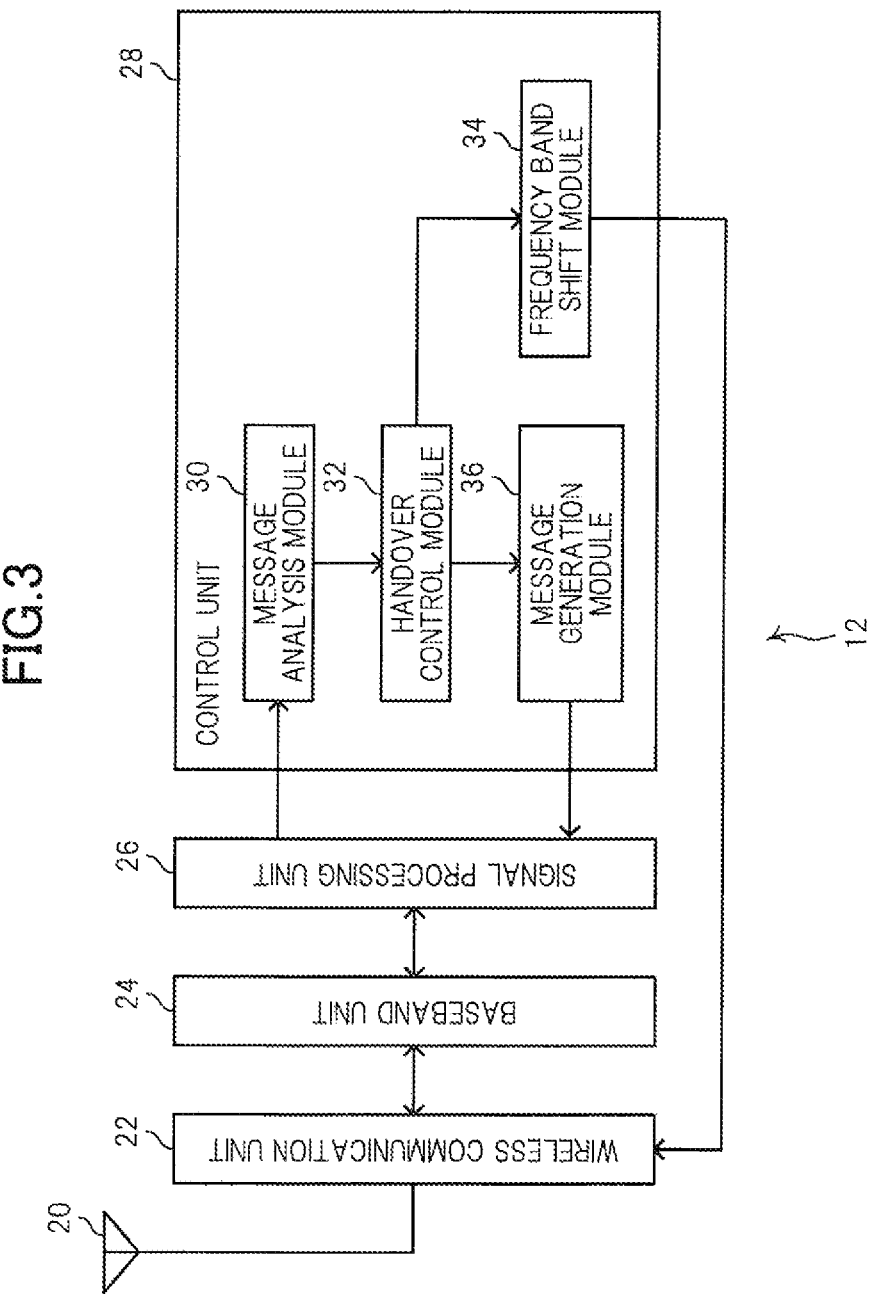
[FIG. 3] A functional block diagram of the mobile station according to the first to third embodiments.
Figure 4:
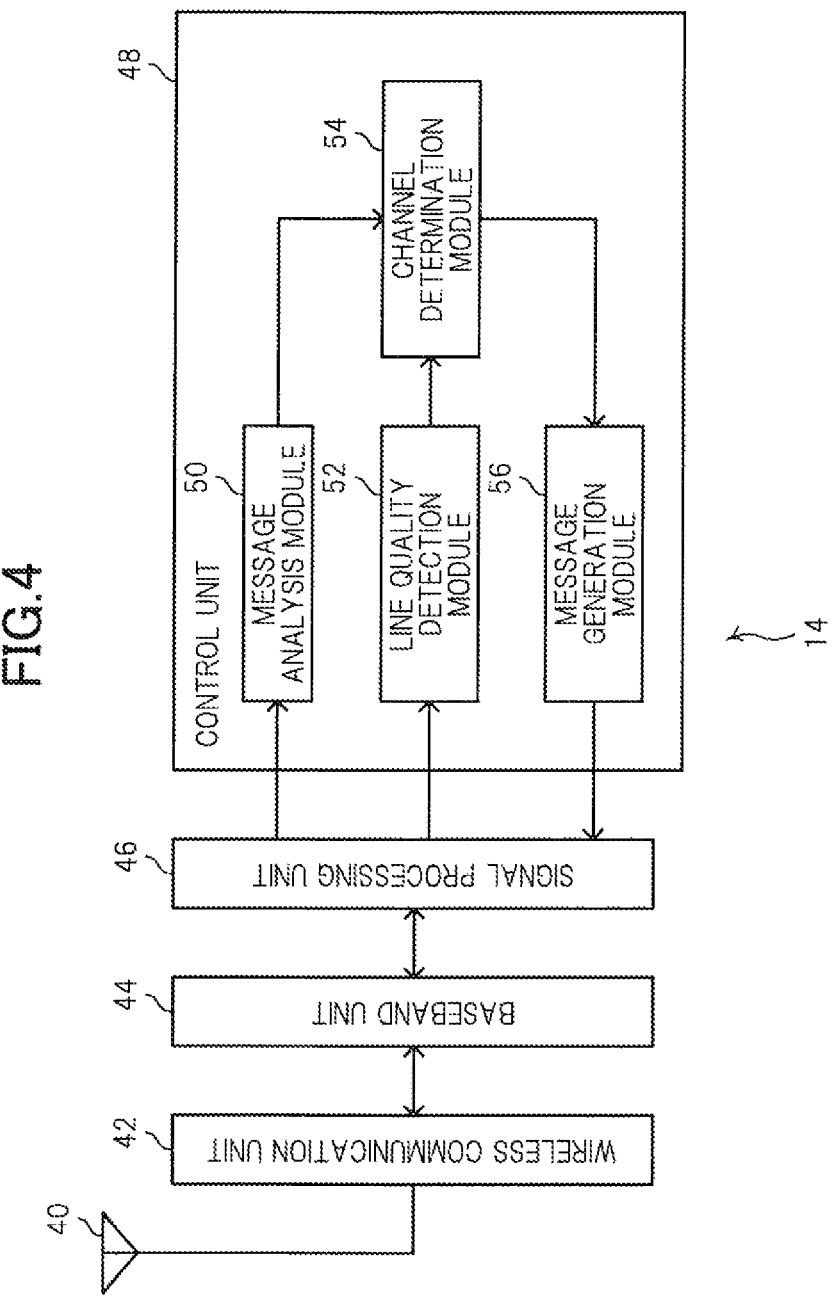
[FIG. 4] A functional block diagram of the base station according to the first to third embodiments.

A specific description is now given of configurations which the mobile station 12 and the base station 14 have for realizing the seamless handover referring to FIGS. 3 and 4.

FIG. 3 is a functional block diagram of the mobile station 12. As illustrated in FIG. 3, the mobile station 12 includes an antenna 20, a wireless communication unit 22, a baseband unit 24, a signal processing unit 26, and a control unit 28 (a message analysis module 30, a handover control module 32, a frequency band shift module 34, and a message generation module 36).

The antenna 20 receives a radio signal from the base station 14, and outputs the received radio signal to the wireless communication unit 22. Moreover, the antenna 20 transmits a radio signal provided by the wireless communication unit 22 to the base station 14.

The wireless communication unit 22 includes a low-noise amplifier, a power amplifier, a frequency converter, a bandpass filter, an A/D converter, and a D/A converter. The wireless communication unit 22 amplifies the radio signal input from the antenna 20 by the low-noise amplifier, and then down-converts the radio signal to an intermediate frequency signal. The wireless communication unit 22 converts the intermediate frequency signal into a digital signal, and then outputs the digital signal to the baseband unit 24. Moreover, the wireless communication unit 22 converts a digital signal input from the baseband unit 24 into an analog signal, and then up-converts the analog signal into a radio signal. The wireless communication unit 22 amplifies the radio signal to a transmission output level by the power amplifier, and then feeds the radio signal to the antenna 20.

The frequency converter of the wireless communication unit 22 switches the operation frequency band of the mobile station 12 by changing a reference frequency to multiply a down-convert subject signal or an up-convert subject signal in accordance with an instruction of the control unit 28 (frequency band shift module 34) described later.

The baseband unit 24 includes a fast Fourier transform (FFT) unit, an inverse fast Fourier transform (IFFT) unit, a serial/parallel converter, and a parallel/serial converter. The baseband unit 24 applies serial/parallel conversion, removal of a guard interval (GI), the fast Fourier transform, parallel/serial conversion, and the like to the digital signal input from the wireless communication unit 22. The baseband unit 24 outputs an acquired complex symbol sequence to the signal processing unit 26. Moreover, the baseband module 24 applies a serial/parallel conversion, the inverse fast Fourier transform, addition of a GI, parallel/serial conversion, and the like to a complex symbol sequence input from the signal processing unit 26. The baseband unit 24 outputs an acquired digital signal to the wireless communication unit 22.

The signal processing unit 26 is constituted by a digital signal processor (DSP), for example. The signal processing unit 26 applies demodulation, decoding, error detection, and the like to the complex symbol sequence input from the baseband unit 24. The signal processing unit 26 outputs acquired received data to the control unit 28. Moreover, the signal processing unit 26 applies addition of an error detection code, coding, modulation, and the like to data to be transmitted and a message directed to the base station 14, which are input from the control unit 28. The signal processing unit 26 outputs an acquired complex symbol sequence to the baseband unit 24.

The control unit 28 is constituted by a CPU and programs for controlling operations of the CPU, for example, and controls respective components of the mobile station 12. Particularly, the control unit 28 functionally includes the message analysis module 30, the handover control module 32, the frequency band shift module 34, and the message generation module 36, and provides control for the handover operation of the mobile station 12 and the like.

The message analysis module 30 extracts various messages from the base station 14 from the received data input from the signal processing unit 26, and analyzes contents of the messages. For example, the message analysis module 30 acquires a link channel (LCH) allocation response message received from the base station 14 from the received data, and acquires a number (information for identifying the timeslot and the sub-channel of an ANCH) of a PRU allocated as an ANCH (individual control channel) to the mobile station 12, and the like. The message from the base station 14 extracted from the received data includes an LCH reallocation response message, a link setting response message, a function extension response message, a connection response message, and an ANCH/CSCH switching instruction message in addition to the LCH allocation response message.

The handover control module 32 controls the handover operation of the mobile station 12. For example, when the mobile station 12 carries out a handover from the base station 14-1 to the base station 14-2, the handover control module 32 instructs the respective components of the mobile station 12 to carry out an LCH allocation request to the base station 14-2, a shift of the operation frequency band of the mobile station 12, establishment of communication to/from the base station 14-2, disconnection from the base station 14-1, and the like.

When the mobile station 12 carries out the handover, the frequency band shift module 34 causes the wireless communication module 22 to change the reference frequency of the frequency converter so that the operation frequency band of the mobile station 12 shifts through the two stages in accordance with an instruction of the handover control module 32 (described later).

The message generation module 36 generates a message directed to the base station 14, and outputs the message to the signal processing unit 26. The messages directed to the base station 14 include an LCH allocation request message, an LCH reallocation request message, a link setting request message, a function extension request message, a connection request message, an ANCH/CSCH switching request message, an ANCH/CSCH switching confirmation message, and the like.

FIG. 4 is a functional block diagram of the base station 14. As illustrated in FIG. 4, the base station 14 includes an antenna 40, a wireless communication unit 42, a baseband unit 44, a signal processing unit 46, and a control unit 48 (a message analysis module 50, a line quality detection module 52, a channel determination module 54, and a message generation module 56).

The antenna 40 receives a radio signal from the mobile station 12, and outputs the received radio signal to the wireless communication unit 42. Moreover, the antenna 40 transmits a radio signal provided by the wireless communication unit 42 to the mobile station 12.

The wireless communication unit 42 includes a low-noise amplifier, a power amplifier, a frequency converter, a bandpass filter, an A/D converter, and a D/A converter. The wireless communication unit 42 amplifies the radio signal input from the antenna 40 by the low-noise amplifier, and then down-converts the radio signal to an intermediate frequency signal. The wireless communication unit 42 converts the intermediate frequency signal to a digital signal, and then outputs the digital signal to the baseband unit 44. Moreover, the wireless communication unit 42 converts a digital signal input from the baseband unit 44 into an analog signal, and then up-converts the analog signal into a radio signal. The wireless communication unit 42 amplifies the radio signal to a transmission output level by the power amplifier, and then feeds the radio signal to the antenna 40.

The baseband unit 44 includes an FFT unit, an IFFT unit, a serial/parallel converter, and a parallel/serial converter. The baseband unit 44 applies serial/parallel conversion, removal of a GI, the fast Fourier transform, parallel/serial conversion, and the like to the digital signal input from the wireless communication unit 42. The baseband unit 44 outputs acquired complex symbols to the signal processing unit 46. Moreover, the baseband module 44 applies a serial/parallel conversion, the inverse fast Fourier transform, addition of a GI, parallel/serial conversion and the like to a complex symbol sequence input from the signal processing unit 46. The baseband unit 44 outputs an acquired digital signal to the wireless communication unit 42.

The signal processing unit 46 is constituted by a DSP, for example. The signal processing unit 46 applies demodulation, decoding, error detection, and the like to the complex symbol sequence input from the baseband unit 44. The signal processing unit 46 outputs acquired received data to the control unit 48. Moreover, the signal processing unit 46 applies addition of an error detection code, coding, modulation, and the like to transmitted data and a message directed to the mobile station 12, which are input from the control unit 48. The signal processing unit 46 outputs an acquired complex symbol sequence to the baseband unit 44.

The control unit 48 is constituted by a CPU and programs for controlling operations of the CPU, for example, and controls respective components of the base station 14. Particularly, the control unit 48 functionally includes the message analysis module 50, the line quality detection module 52, the channel determination module 54, and the message generation module 56, and carries out determination of the PRUs (such as an ANCH and an EXCH) to be allocated to the mobile station 12, and the like.

The message analysis module 50 extracts various messages from the mobile station 12 from the received data input from the signal processing unit 46, and analyzes contents of the messages. The messages from the mobile station 12 extracted from the received data include the LCH allocation request message, the LCH reallocation request message, the link setting request message, the function extension request message, the connection request message, the ANCH/CSCH switching request message, the ANCH/CSCH switching confirmation message, and the like.

The line quality detection module 52 detects a line quality value representing a line quality of each of the PRUs belonging to the operation frequency band of the base station 14 based on the complex symbol sequence input via the signal processing unit 46 from the baseband unit 44. The line quality value detected by the line quality detection module 52 includes a received signal strength indication (RSSI) and a signal to noise ratio (SNR) detected by using the carrier sense (interference wave measurement), for example.

The channel determination module 54 determines PRUs to be allocated to the mobile station 12 based on the line quality value detected by the line quality detection module 52, an available state of the PRUs, the amount of data transmitted/received to/from the mobile station 12, a communication type (such as audio communication and packet communication), contract information on the mobile station 12 (information on an upper limit of the number of PRUs that can be allocated to the mobile station 12), and the like. For example, the channel determination module 54 determines a PRU to be allocated as an ANCH (individual control channel) to the mobile station 12 based on the LCH allocation request message from the mobile station 12. Moreover, the channel determination module 54 determines at least one PRU to be allocated as an EXCH (communication channel) to the mobile station 12 for every frame or every plurality of frames. Further, the channel determination module 54 changes a PRU to be allocated as an ANCH to a mobile station 12 based on the ANCH/CSCH switching request message from the mobile station 12.

The message generation module 56 generates a message directed to the mobile station 12, and outputs the message to the signal processing unit 46. The messages directed to the mobile station 12 include the LCH allocation response message containing the number of a PRU allocated as an ANCH to the mobile station 12, the LCH reallocation response message, the link setting response message, the function extension response message, the connection response message, the ANCH/CSCH switching instruction message, and the like.

A specific description is now given of operations of the mobile station 12 and the base stations 14-1 and 14-2 when the mobile station 12 carries out the handover from the base station 14-1 to the base station 14-2 referring to FIGS. 5A, 5B, and 6A to 6I.

FIG. 5A is a sequence diagram illustrating an example of the handover method according to the first embodiment.

Figure 5B:
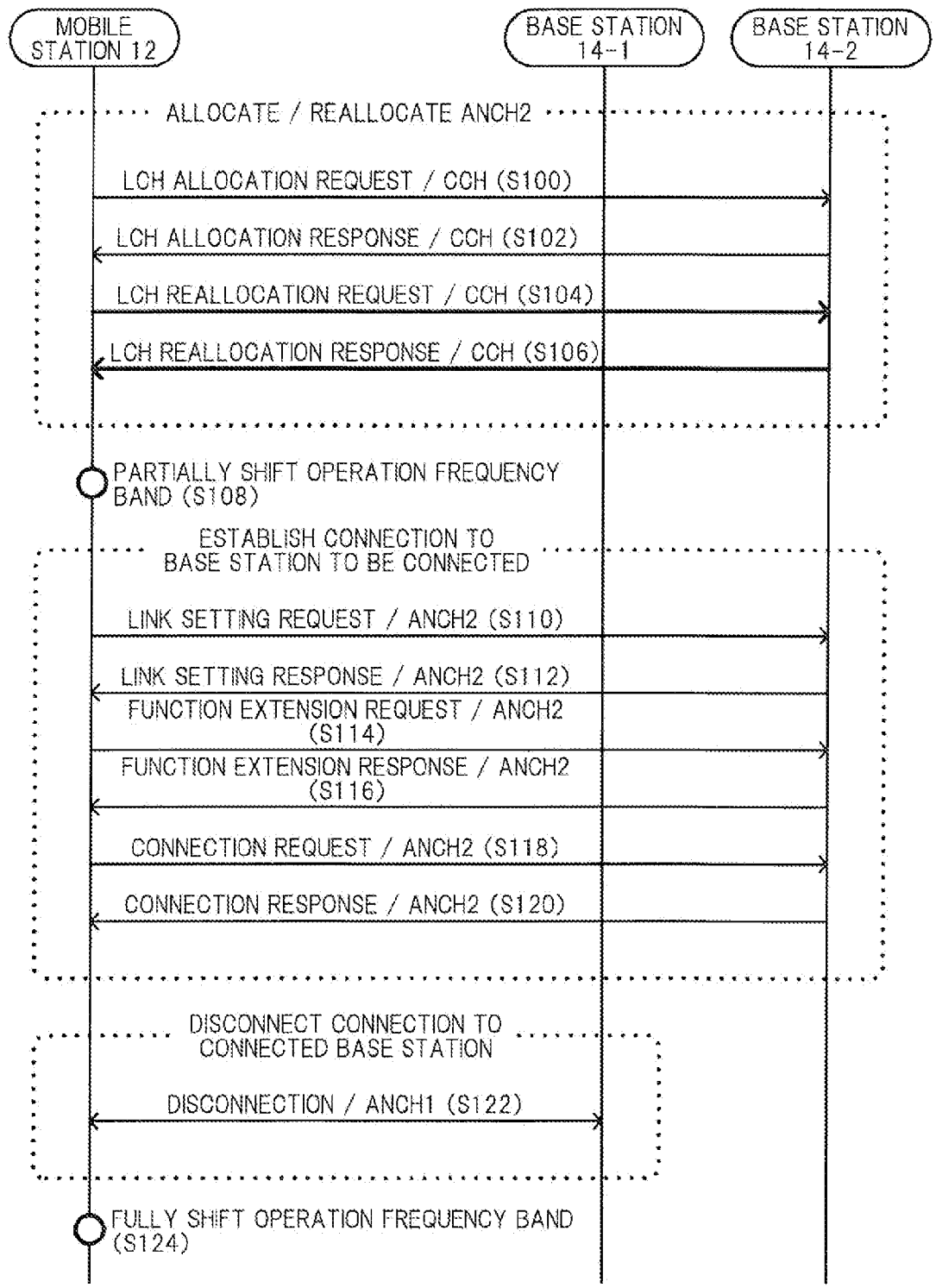
[FIG. 5B] A sequence diagram illustrating another example of the handover method according to the first embodiment.

Moreover, FIG. 5B is a sequence diagram illustrating another example of the handover method according to the first embodiment. On this occasion, it is assumed that a relationship between the operation frequency band of the connected base station 14-1 before the handover, the operation frequency band of the base station 14-2 to be connected, the operation frequency band of the mobile station 12, and PRUs (ANCH1 and EXCHs) allocated by the base station 14-1 to the mobile station 12 is as illustrated in FIG. 6A. Hatched portions in FIGS. 6A to 6I indicate the operation frequency band of the mobile station 12.

As illustrated in FIG. 5A, when the mobile station 12 starts the handover to the base station 14-2, the mobile station 12 transmits the LCH allocation request message to the base station 14-2 to be connected via the CCH (Sch9 at which the operation frequency band of the base station 14-1 and the operation frequency band of the base station 14-2 overlap) (S100).

The base station 14-2 determines a PRU (ANCH2) to be allocated as the ANCH to the mobile station 12 in response to the LCH allocation request message from the mobile station 12. Specifically, the channel determination module 54 of the base station 14-2 determines the ANCH2 based on the line quality value detected by the line quality detection module 52 and an available state of the PRUs. Then, the base station 14-2 transmits the LCH allocation response message containing the PRU number of the determined ANCH2 to the mobile station 12 via the CCH (S102).

Then, the mobile station 12 determines whether or not the timeslot of the ANCH2 notified from the base station 14-2 in S102 is different from the timeslot of the ANCH1 allocated by the base station 14-1.

On this occasion, when the timeslot of the ANCH2 is different from the timeslot of the ANCH1 as illustrated in FIG. 6B, the mobile station 12 shifts, as illustrated in FIG. 6C, the own operation frequency band in the timeslot (Slot2) of the ANCH2 to sub-channels Sch9 to Sch17, which correspond to the operation frequency band (frequency band containing the ANCH2) of the base station 14-2 (S108: first shift). Specifically, the frequency band shift module 34 of the mobile station 12 causes the wireless communication module 22 to change the reference frequency of the frequency converter so that the operation frequency band in Slot2 of the mobile station 12 is shifted to sub-channels Sch9 to Sch17.

It should be noted that, in the first shift, the operation frequency band of the mobile station 12 may be shifted so that the bottom end (end on the side of the operation frequency band of the base station 14-2) of the operation frequency band of the mobile station 12 in the timeslot of the ANCH2 would be equal to the frequency (Sch12) of the ANCH2. If we do this way, a shift amount (first shift amount) of the operation frequency band of the mobile station 12 in the timeslot of the ANCH2 can be minimized, and hence the number of EXCHs (communication channels) released by the first shift may decrease.

At the time point of S108, the operation frequency band of the mobile station 12 in the timeslot (Slot2) of the ANCH2 is in the frequency band containing the ANCH2, and the operation frequency band of the mobile station 12 in the timeslots (Slot1, 3, and 4) different from the timeslot of the ANCH2 is in the frequency band containing the ANCH1 (refer to FIG. 6C). Therefore, the mobile station 12 can simultaneously carry out the wireless communication both to/from the base station 14-1 and the base station 14-2 respectively via the ANCH1 and the ANCH2. Then, the mobile station 12 establishes a connection to the base station 14-2 via the ANCH2 after the first shift. In other words, the mobile station 12 establishes the connection to the base station 14-2 by transmitting/receiving, via the ANCH2, the link setting request message (S110), the link setting response message (S112), the function extension request message (S114), the function extension response message (S116), the connection request message (S118), and the connection response message (S120). The base station 12 maintains during this period the data communication via the ANCH1 and the EXCHs (refer to FIG. 6C) which have not been released by the first shift and remain.

When the connection to the base station 14-2 is established, the mobile station 12 disconnects the connection to the base station 14-1 via the ANCH1 (S122). As a result, all the PRUs allocated as the ANCH1 and the EXCHs to the mobile station 12 are released. Then, as illustrated in FIG. 6D, the mobile station 12 completely shifts the own operation frequency band to sub-channels Sch9 to Sch17, which correspond to the operation frequency band of the base station 14-2 (S124: second shift). Specifically, the frequency band shift module 34 of the mobile station 12 causes the wireless communication module 22 to change the reference frequency of the frequency converter so that the operation frequency band of the mobile station 12 is shifted to sub-channels Sch9 to Sch17.

Then, the mobile station 12 continues the data communication via the ANCH2 and the newly allocated EXCHs by the base station 14-2. The mobile station 12 completes the handover from the base station 14-1 to the base station 14-2 without disconnection of the data communication, namely seamlessly, in this way.

In contrast to this, when the timeslot of the ANCH2 notified from the base station 14-2 in S102 is the same as the timeslot of the ANCH1 allocated by the base station 14-1 as illustrated in FIG. 6E, the operation frequency band of the mobile station 12 in the timeslot of the ANCH2 may not be shifted to a frequency band containing both the ANCH1 and the ANCH2 (refer to FIG. 6F). Therefore, the mobile station 12 requests the base station 14-2 to reallocate the ANCH2 via the CCH (Sch9) so that these timeslots would be different from each other. In other words, as illustrated in FIG. 5B, the mobile station 12 transmits the LCH reallocation request message via the CCH to the base station 14-2 to be connected (S104).

The base station 14-2 determines a new ANCH2 different from the ANCH2 notified to the mobile station 12 from among Sch10 to Sch16 in response to the LCH reallocation request message from the mobile station 12. Then, the base station 14-2 transmits the LCH reallocation response message containing the PRU number of the newly determined ANCH2 to the mobile station 12 via the CCH (S106). It should be noted that the mobile station 12 may repeat the transmission of the LCH reallocation request message (S106) until the timeslot of the ANCH2 becomes different from the timeslot of the ANCH1.

Then, as illustrated in FIG. 6G, when the timeslot of the ANCH2 is different from the timeslot of the ANCH1 as a result of the reallocation of the ANCH2, the mobile station 12 shifts, as illustrated in FIG. 6H, the own operation frequency band in the timeslot (Slot3) of the ANCH2 to sub-channels Sch9 to Sch17 which correspond to the operation frequency band of the base station 14-2 (S108: first shift).

The mobile station 12 establishes a connection to the base station 14-2 via the ANCH2 after the first shift (S110 to S120). When the connection to the base station 14-2 is established, the mobile station 12 disconnects the connection to the base station 14-1 via the ANCH1 (S122). The mobile station 12 then completely shifts the own operation frequency band to sub-channels Sch9 to Sch17, which correspond to the operation frequency band of the base station 14-2, as illustrated in FIG. 6I (S124: second shift).

In this way, in the mobile communication system 10 according to the first embodiment, even in the case where the timeslot of the ANCH2 notified from the base station 14-2 is the same as the timeslot of the ANCH1 allocated by the base station 14-1, the mobile station 12 can make these timeslots different from each other by requesting the base station 14-2 to be connected to reallocate the ANCH2. Therefore, the mobile station 12 can seamlessly carry out the handover from the base station 14-1 using sub-channels Sch1 to Sch9 to the base station 14-2 using sub-channels Sch9 to Sch17.

Second Embodiment

The mobile communication system 10 according to a second embodiment of the present invention has the same system configuration and the wireless channel configuration as those of the mobile communication system 10 according to the first embodiment.

In other words, as illustrated in FIG. 1, the mobile communication system 10 according to the second embodiment includes a plurality of mobile stations 12 (only one of those mobile stations is illustrated in the figure), and a plurality of base stations 14 (only the close base stations 14-1 and 14-2 are illustrated in the figure).

Moreover, the wireless channel configuration illustrated in FIG. 2A is defined in the mobile communication system 10 according to the second embodiment. Moreover, as illustrated in FIG. 2B, it is assumed that sub-channels Sch1 to Sch9 (width: 8.1 MHz) are set as the operation frequency band of the base station 14-1, and sub-channels Sch9 to Sch17 (width: 8.1 MHz) are set as the operation frequency band of the base station 14-2 in order to avoid interference (Sch1, Sch9, and Sch17 are defined as CCHs). Moreover, it is assumed that the frequency band width available for the mobile station 12 is a frequency band width corresponding to the nine sub-channels (8.1 MHz), which is the same as the operation frequency band width of the base stations 14-1 and 14-2.

Moreover, as illustrated in FIG. 3, the mobile station 12 according to the second embodiment includes the antenna 20, the wireless communication unit 22, the baseband unit 24, the signal processing unit 26, and the control unit 28 (the message analysis module 30, the handover control module 32, the frequency band shift module 34, and the message generation module 36).

Moreover, as illustrated in FIG. 4, the base station 14 according to the second embodiment includes the antenna 40, the wireless communication unit 42, the baseband unit 44, the signal processing unit 46, and the control unit 48 (the message analysis module 50, the line quality detection module 52, the channel determination module 54, and the message generation module 56).

However, in the second embodiment, when the mobile station 12 starts a handover from the base station 14-1 to the base station 14-2, the mobile station 12 notifies, via the CCH (Sch9), the base station 14-2 of identification information indicating the timeslot of the ANCH (ANCH1) allocated by the base station 14-1, which is different from the first embodiment. Then, the base station 14-2 determines, based on the identification information notified by the mobile station 12, the ANCH (ANCH2) to be allocated to the mobile station 12 out of available PRUs (PRUs which are not allocated to any mobile stations 12 and interference wave level of which is equal to or less than a predetermined value, for example) belonging to a timeslot different from the timeslot of the ANCH1. This configuration prevents the timeslot of the ACNH2 from coinciding with the timeslot of the ANCH1.

In this way, there is a slight difference between the first embodiment and the second embodiment in the control of the handover operation by the control unit 28 of the mobile station 12, and in the determination of the ANCH by the channel determination module 54 of the base station 14.

A specific description is now given of operations of the mobile station 12 and the base stations 14-1 and 14-2 when the mobile station 12 carries out the handover from the base station 14-1 to the base station 14-2 referring to FIGS. 7, and 8A to 8I by focusing on the different point.

FIG. 7 is a sequence diagram illustrating an example of the handover method according to the second embodiment. On this occasion, it is assumed that a relationship among the operation frequency band of the connected base station 14-1 before the handover, the operation frequency band of the base station 14-2 to be connected, the operation frequency band of the mobile station 12, and PRUs (ANCH1 and EXCHs) allocated by the base station 14-1 to the mobile station 12 is as illustrated in FIG. 8A. Hatched portions in FIGS. 8A to 8E indicate the operation frequency band of the mobile station 12.

As illustrated in FIG. 7, when the mobile station 12 starts the handover to the base station 14-2, the base station 12 transmits the LCH allocation request message to the base station 14-2 to be connected via the CCH (S200). This LCH allocation request message contains the identification information indicating the timeslot of the ANCH1. The timeslot itself of the ANCH1 or the PRU number (information for identifying the timeslot and the sub-channel of the ANCH1) of the ANCH1, for example, is used as the identification information indicating the timeslot of the ANCH1.

The base station 14-2 determines an ANCH2 to be allocated to the mobile station 12 in response to the LCH allocation request message from the mobile station 12. Specifically, the channel determination module 54 of the base station 14-2 determines the ANCH2 out of available PRUs (refer to an inside of thick lines in FIG. 8B) belonging to timeslots other than the timeslot of the ANCH1 based on the identification information contained in the LCH allocation request message, the line quality value detected by the line quality detection module 52, the available state of the PRUs, and the like.

It should be noted that the channel determination module 54 may select PRUs closest to the frequency of the ANCH1 (refer to a hatched portion in FIG. 8B) out of the available PRUs as the ANCH 2. If we do this way, a shift amount (first shift amount) of the operation frequency band of the mobile station 12 can be minimized, and hence the number of EXCHs (communication channels) released by the first shift can be reduced. On this occasion, it is assumed that one of the PRUs closest to the frequency of the ANCH1 out of the available PRUs is determined as the ANCH2 as illustrated in FIG. 8C.

Then, the base station 14-2 transmits the LCH allocation response message containing the PRU number of the determined ANCH2 to the mobile station 12 via the CCH (S202).

In the second embodiment, the timeslot of the ANCH2 notified by the base station 14-2 in S202 is different from the timeslot of the ANCH1 allocated by the base station 14-1. Therefore, the mobile station 12 shifts the own operation frequency band in the timeslot (Slot2) of the ANCH2 to a frequency band (which may be the operation frequency band of the base station 14-2) containing the ANCH2 (S204: first shift).

It should be noted that the operation frequency band of the mobile station 12 may be shifted, as illustrated in FIG. 8D, so that the bottom end (end on the side of the operation frequency band of the base station 14-2) of the operation frequency band of the mobile station 12 in the timeslot of the ANCH2 is equal to the frequency (Sch10) of the ANCH2. If we do this way, a shift amount (first shift amount) of the operation frequency band of the mobile station 12 in the timeslot of the ANCH2 can be minimized. In the example illustrated in FIG. 8D, the number of EXCHs released by the first shift is zero.

The mobile station 12 establishes a connection to the base station 14-2 via the ANCH2 after the first shift (S206 to S216). When the connection to the base station 14-2 is established, the mobile station 12 disconnects the connection to the base station 14-1 via the ANCH1 (S218). The mobile station 12 then completely shifts the own operation frequency band to sub-channels Sch9 to Sch17, which correspond to the operation frequency band of the base station 14-2, as illustrated in FIG. 6I (S220: second shift).

In this way, it is possible to prevent the timeslot of the ANCH2 from coinciding with the timeslot of the ANCH1 in the mobile communication system 10 according to the second embodiment. Therefore, the mobile station 12 can carry out more quickly the handover from the base station 14-1 using sub-channels Sch1 to Sch9 to the base station 14-2 using sub-channels Sch9 to Sch17.

Third Embodiment

The mobile communication system 10 according to a third embodiment of the present invention has the same system configuration and the wireless channel configuration as those of the mobile communication system 10 according to the first embodiment.

In other words, as illustrated in FIG. 1, the mobile communication system 10 according to the third embodiment includes a plurality of mobile stations 12 (only one of those mobile stations is illustrated in the figure), and a plurality of base stations 14 (only the close base stations 14-1 and 14-2 are illustrated in the figure).

Moreover, the wireless channel configuration illustrated in FIG. 2A is defined in the mobile communication system 10 according to the third embodiment. Moreover, as illustrated in FIG. 2B, it is assumed that sub-channels Sch1 to Sch9 (width: 8.1 MHz) are set as the operation frequency band of the base station 14-1 and sub-channels Sch9 to Sch17 (width: 8.1 MHz) are set as the operation frequency band of the base station 14-2 in order to avoid interference (Sch1, Sch9, and Sch17 are defined as CCHs). Moreover, it is assumed that the frequency band width available for the mobile station 12 is a frequency band width corresponding to the nine sub-channels (8.1 MHz), which is the same as the operation frequency band width of the base stations 14-1 and 14-2.

Moreover, as illustrated in FIG. 3, the mobile station 12 according to the third embodiment includes the antenna 20, the wireless communication unit 22, the baseband unit 24, the signal processing unit 26, and the control unit 28 (the message analysis module 30, the handover control module 32, the frequency band shift module 34, and the message generation module 36).

Moreover, as illustrated in FIG. 4, the base station 14 according to the third embodiment includes the antenna 40, the wireless communication unit 42, the baseband unit 44, the signal processing unit 46, and the control unit 48 (the message analysis module 50, the line quality detection module 52, the channel determination module 54, and the message generation module 56).

However, in the third embodiment, when the mobile station 12 carries out the handover from the base station 14-1 to the base station 14-2, if the timeslot of the ANCH (ANCH2) notified by the base station 14-2 via the CCH (Sch9) is the same as the timeslot of the ANCH (ANCH1) allocated by the base station 14-1, the mobile station 12 requests, instead of the base station 14-2 to be connected, the connected base station 14-1 to reallocate the ANCH1 so that the timeslots thereof are different from each other, which is different from the first embodiment. Then, the base station 14-1 determines a new ANCH1 different from the ANCH1 allocated to the mobile station 12 in response to the reallocation request of the ANCH1 from the mobile station 12.

In this way, there is a slight difference between the first embodiment and the third embodiment in the control of the handover operation by the control unit 28 of the mobile station 12, and in the determination of the ANCH by the channel determination module 54 of the base station 14.

A specific description is now given of operations of the mobile station 12 and the base stations 14-1 and 14-2 when the mobile station 12 carries out the handover from the base station 14-1 to the base station 14-2 referring to FIGS. 9, and 10A to 10G by focusing on the different point.

Figure 9:
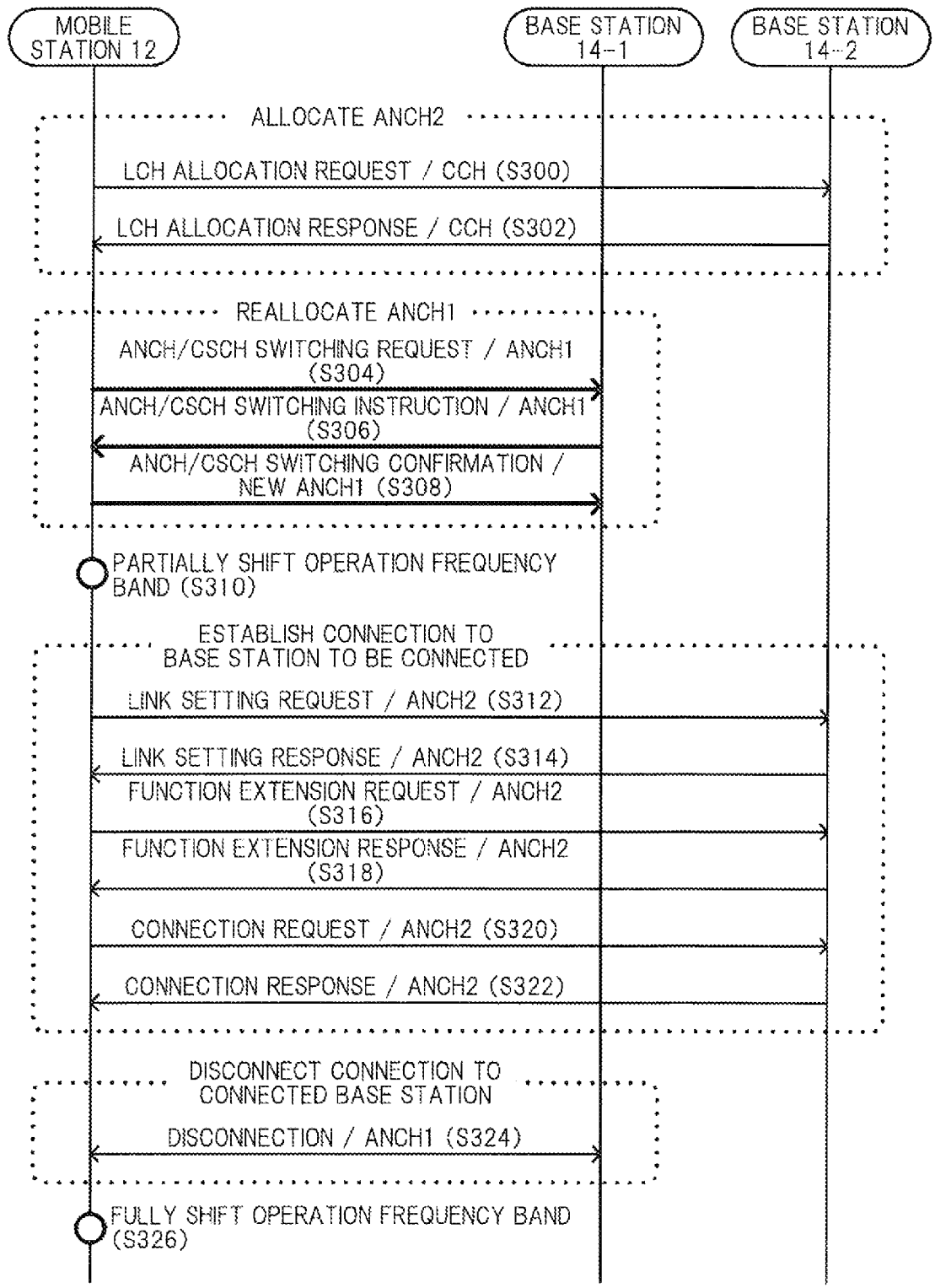
[FIG. 9] A sequence diagram illustrating an example of the handover method according to the third embodiment.
Figure 10F:
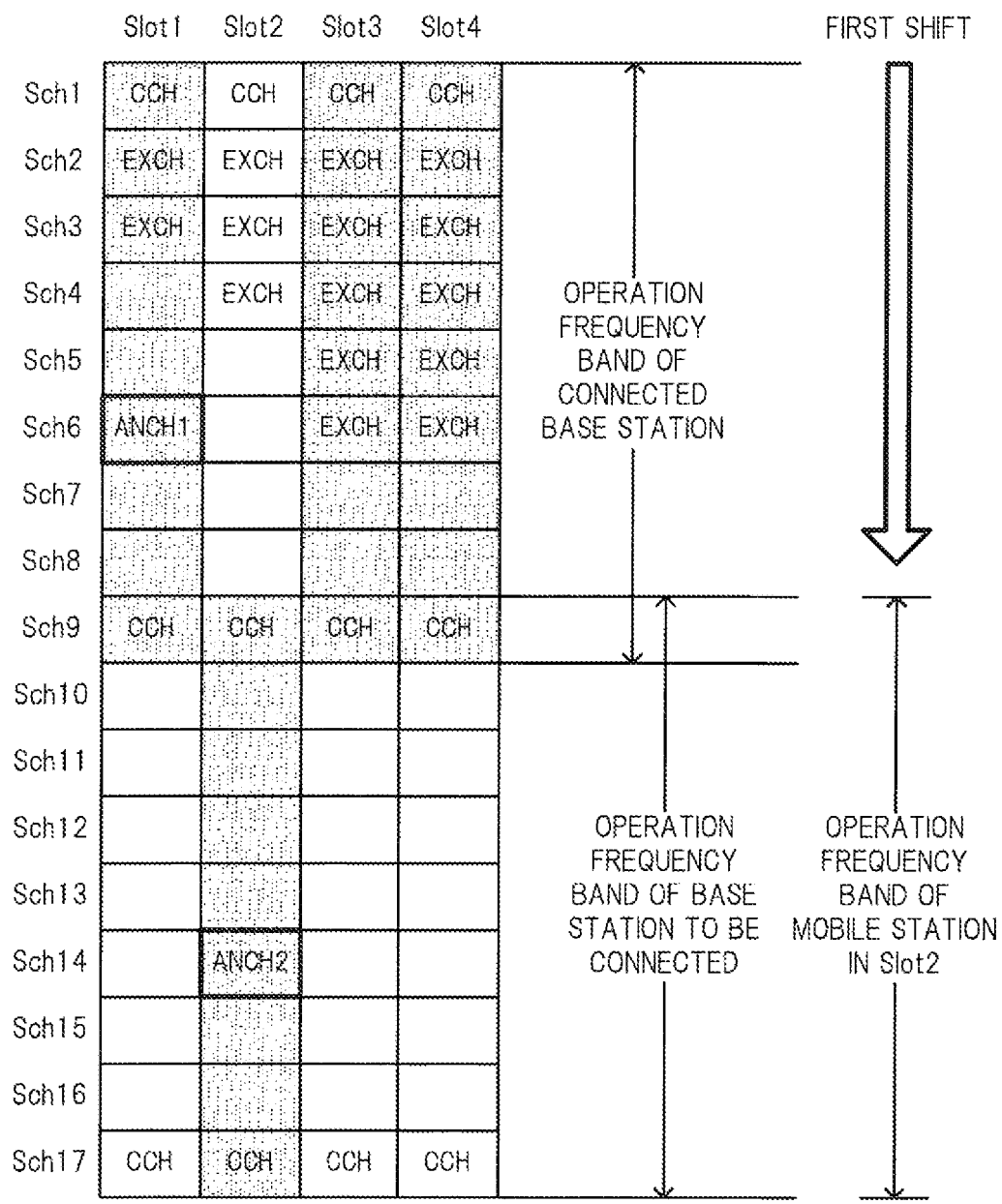
[FIG. 10F] A diagram illustrating the operation frequency band of the mobile station in Slot2 shifted to the operation frequency band of the base station to be connected (first shift) after the state illustrated in FIG. 10E.

FIG. 9 is a sequence diagram illustrating an example of the handover method according to the third embodiment. On this occasion, it is assumed that a relationship among the operation frequency band of the connected base station 14-1 before the handover, the operation frequency band of the base station 14-2 to be connected, the operation frequency band of the mobile station 12, and PRUs (ANCH1 and EXCHs) allocated by the base station 14-1 to the mobile station 12 is as illustrated in FIG. 10A. Hatched portions in FIGS. 10A to 10G indicate the operation frequency band of the mobile station 12.

As illustrated in FIG. 9, when the mobile station 12 starts the handover to the base station 14-2, the base station 12 transmits the LCH allocation request message to the base station 14-2 to be connected via the CCH (S300).

The base station 14-2 determines an ANCH2 to be allocated to the mobile station 12 in response to the LCH allocation request message from the mobile station 12. Specifically, the channel determination module 54 of the base station 14-2 determines the ANCH2 based on the line quality value detected by the line quality detection module 52, the available state of the PRUs, and the like. Then, the base station 14-2 transmits the LCH allocation response message containing the PRU number of the determined ANCH2 to the mobile station 12 via the CCH (S302).

Then, the mobile station 12 determines whether or not the timeslot of the ANCH2 notified from the base station 14-2 in 5302 is different from the timeslot of the ANCH1 allocated by the base station 14-1.

On this occasion, as illustrated in FIG. 10B, when the timeslot of the ANCH2 is the same as the timeslot of the ANCH1, the operation frequency band of the mobile statin 12 in the timeslot of the ANCH2 may not be shifted to a frequency band containing both the ANCH1 and the ANCH2 (refer to FIG. 10C). Therefore, the mobile station 12 requests the base station 14-1 to reallocate the ANCH1 so that these timeslots are different from each other. In other words, the mobile station 12 transmits the ANCH/CSCH switching request message to the connected base station 14-1 via the ANCH1 (S304). This ANCH/CSCH switching request message contains the identification information indicating the timeslot of the ANCH2. The timeslot itself of the ANCH2 or the PRU number (information for identifying the timeslot and the sub-channel of the ANCH2) of the ANCH2, for example, is used as the identification information indicating the timeslot of the ANCH2.

The base station 14-1 determines a new ANCH1 different from the ANCH1 allocated to the mobile station 12 from among Sch2 to Sch8 in response to the ANCH/CSCH switching request message from the mobile station 12. Specifically, the channel determination module 54 of the base station 14-1 determines the ANCH1 out of available PRUs (refer to an inside of thick lines in FIG. 10D) belonging to timeslots other than the timeslot of the ANCH2 based on the identification information contained in the ANCH/CSCH switching request message, the line quality value detected by the line quality detection module 52, the available state of the PRUs, and the like.

Then, the base station 14-1 transmits the ANCH/CSCH switching response message containing the PRU number of the newly determined ANCH1 via the ANCH1 allocated to the mobile station 12 to the mobile station 12 (S306). On this occasion, it is assumed that a PRU inside of thick lines in FIG. 10E is determined as the new ANCH1. The mobile station 12, which has received the ANCH/CSCH switching response message from the base station 14-1, returns the ANCH/CSCH switching confirmation message to the base station 14-1 via the new ANCH1 (S308).

When the timeslot of the ANCH1 reallocated by the base station 14-1 is different from the timeslot of the ANCH2 notified by the base station 14-2 in 5302, as illustrated in FIG. 10F, the mobile station 12 shifts the own operation frequency band in the timeslot (Slot2) of the ANCH2 to sub-channels Sch9 to Sch17, which correspond to the operation frequency band of the base station 14 (S310: first shift).

It should be noted that, in the first shift, the operation frequency band of the mobile station 12 may be shifted so that the bottom end (end on the side of the operation frequency band of the base station 14-2) of the operation frequency band of the mobile station 12 in the timeslot of the ANCH2 is equal to the frequency (Sch14) of the ANCH2. If we do this way, a shift amount (first shift amount) of the operation frequency band of the mobile station 12 in the timeslot of the ANCH2 can be minimized, and hence the number of EXCHs (communication channels) released by the first shift may decrease.

The mobile station 12 establishes a connection to the base station 14-2 via the ANCH2 after the first shift (S312 to S322). When the connection to the base station 14-2 is established, the mobile station 12 disconnects the connection to the base station 14-1 via the ANCH1 (S324). The mobile station 12 then completely shifts the own operation frequency band to sub-channels Sch9 to Sch17, which correspond to the operation frequency band of the base station 14-2, as illustrated in FIG. 10G (S326: second shift).

In this way, in the mobile communication system 10 according to the third embodiment, even in the case where the timeslot of the ANCH2 notified from the base station 14-2 is the same as the timeslot of the ANCH1 allocated by the base station 14-1, the mobile station 12 can make these timeslots different from each other by requesting the base station 14-1 to be connected to reallocate the ANCH1. Therefore, the mobile station 12 can seamlessly carry out the handover from the base station 14-1 using sub-channels Sch1 to Sch9 to the base station 14-2 using sub-channels Sch9 to Sch17.

CONCLUSION

The mobile communication systems 10 according to the first to third embodiments described above can realize the seamless handover between the base stations 14 using different frequency bands.

It should be noted that the present invention is not limited to the first to third embodiments.

For example, the wireless channel configuration may be a configuration different from the wireless channel configuration illustrated in FIG. 2A. Moreover, the relationship between the operation frequency bands of the base stations 14 and the operation frequency band of the mobile station 12 may be a relationship different from the relationship illustrated in FIG. 2B. Particularly, the operation frequency band of the base station 14-1 and the operation frequency band of the base station 14-2 do not need to overlap at the frequency defined as the CCH (common channel) (do not need to have the wireless channel configuration referred to as dual CCH), and it is only necessary that the operation frequency band of the mobile station 12 connected to the base station 14-1 contains the operation frequency band (first frequency band) of the base station 14-1 and the CCH defined on the end on the side of the first frequency band in the operation frequency band (second frequency band) of the base station 14-2 to be connected.

Moreover, the application of the present invention is not limited to the mobile communication system employing the OFDM scheme and the TDMA/TDD scheme, and the present invention can generally be applied to a mobile communication system including a first base station using a first frequency band, a second base station using a second frequency band different from the first frequency band, and a mobile station carrying out a handover from the first base station to the second base station.

The invention claimed is:

1. A mobile communication system employing a time-division multiple-access scheme, comprising:
 a first base station which uses a first frequency band;
 a second base station which uses a second frequency band different from the first frequency band; and
 a mobile station to which a first control channel belonging to the first frequency band is allocated by the first base station,
 the mobile station connected to the first base station having a operation frequency band which contains the first frequency band and a common channel defined on an end on a side of the first frequency band in the second frequency band, wherein:
 the second base station includes:
  control channel determination means for determining a second control channel in the second frequency band to be allocated to the mobile station in response to a start of a handover by the mobile station from the first base station to the second base station; and
  means for notifying, via the common channel, the mobile station of the second control channel determined by the control channel determination means;
 the mobile station includes:
  frequency band shift means for shifting, when a timeslot of the second control channel notified by the second base station is different from a timeslot of the first control channel, the operation frequency band of the mobile station in the timeslot of the second control channel to a frequency band containing the second control channel; and
  means for establishing a connection to the second base station via the second control channel after the operation frequency band of the mobile station in the timeslot of the second control channel is shifted; and
  the frequency band shift means shifts the operation frequency band of the mobile station to the second frequency band after the connection to the second base station is established.

2. The mobile communication system according to claim 1, wherein the frequency band shift means shifts, when the timeslot of the second control channel notified by the second base station is different from the timeslot of the first control channel, the operation frequency band of the mobile station in the timeslot of the second control channel so that an end on a side of the second frequency band in the operation frequency band of the mobile station is equal to a frequency of the second control channel.

3. The mobile communication system according to claim 1, wherein:
 the mobile station includes reallocation request means for requesting, when the timeslot of the second control channel notified by the second base station is the same as the timeslot of the first control channel, the second base station to reallocate a control channel via the common channel so that the timeslots are different from each other; and
 the control channel determination means determines a new second control channel in the second frequency band, different from the second control channel had notified to the mobile station in response to the reallocation request for the control channel from the mobile station.

4. The mobile communication system according to claim 1, wherein:
 the mobile station further includes means for notifying the second base station of identification information indicating the timeslot of the first control channel via the common channel when the mobile station starts the handover from the first base station to the second base station; and
 the control channel determination means determines the second control channel of available channels belonging to a timeslot different from the timeslot of the first control channel based on the identification information notified by the mobile station.

5. The mobile communication system according to claim 4, wherein the control channel determination means determines, as the second control channel, an available channel having a frequency closest to a frequency of the first control channel of the available channels belonging to the timeslot different from the timeslot of the first control channel based on the identification information notified by the mobile station.

6. A mobile station for carrying out a handover from a first base station which uses a first frequency band, to a second base station which uses a second frequency band different from the first frequency band, the mobile station connected to the first base station having a operation frequency band which contains the first frequency band and a common channel defined on an end on a side of the first frequency band in the second frequency band, the mobile station comprising:
 frequency band shift means for shifting, when a timeslot of a first control channel which belongs to the first frequency band allocated by the first base station is different form a timeslot of a second control channel which belongs to the second frequency band and is notified by the second base station via the common channel in response to a start of the handover, the operation frequency band of the mobile station in the timeslot of the second control channel to a frequency band containing the second control channel; and means for establishing a connection to the second base station via the second control channel after the operation frequency band of the mobile station in the timeslot of the second control channel is shifted, wherein the frequency band shift means shifts the operation frequency band of the mobile station to the second frequency band after the connection to the second base station is established.

7. A base station, which uses a second frequency band different from a first frequency band used by another base station, the another base station being connected to a mobile station having a operation frequency band which contains the first frequency band and a common channel defined on an end on a side of the first frequency band in the second frequency band, the base station comprising:

control channel determination means for determining a second control channel in the second frequency band to be allocated to the mobile station in response to a start of a handover from the another base station to the base station by the mobile station to which a first control channel belonging to the first frequency band is allocated by the another base station;

means for notifying, via the common channel, the mobile station of the second control channel determined by the control channel determination means; and means for establishing a connection to the mobile station via the second control channel after the operation frequency band of the mobile station in a timeslot of the second control channel is shifted to a frequency band containing the second control channel.

8. A handover method for use in a mobile communication system, the mobile communication system comprising:

a first base station which uses a first frequency band;

a second base station which uses a second frequency band different from the first frequency band; and a mobile station to which a first control channel belonging to the first frequency band is allocated by the first base station, the mobile station connected to the first base station having a operation frequency band which contains the first frequency band and a common channel defined on an end on a side of the first frequency band in the second frequency band, the handover method comprising:

a control channel determination step of determining, by the second base station, a second control channel in the second frequency band to be allocated to the mobile station in response to a start of a handover by the mobile station from the first base station to the second base station;

a step of notifying, by the second base station, via the common channel, the mobile station of the second control channel determined in the control channel determination step;

a step of shifting, when a timeslot of the second control channel notified by the second base station is different from a timeslot of the first control channel, the operation frequency band of the mobile station in the timeslot of the second control channel to a frequency band containing the second control channel;

a step of establishing, by the mobile station, a connection to the second base station via the second control channel after the operation frequency band of the mobile station in the timeslot of the second control channel is shifted; and a step of shifting the operation frequency band of the mobile station to the second frequency band after the connection between the mobile station and the second base station is established.

\* \* \* \* \*